United States Patent

Miura et al.

(10) Patent No.: US 7,948,354 B2
(45) Date of Patent: *May 24, 2011

(54) SURFACE-MOUNT NEGATIVE-CHARACTERISTIC THERMISTOR

(75) Inventors: Tadamasa Miura, Yasu (JP); Shinichiro Nawai, Ritto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/396,600

(22) Filed: Mar. 3, 2009

(65) Prior Publication Data
US 2009/0167482 A1    Jul. 2, 2009

Related U.S. Application Data

(63) Continuation of application No. 11/835,272, filed on Aug. 7, 2007, now Pat. No. 7,548,149, which is a continuation of application No. PCT/JP2006/301991, filed on Feb. 6, 2006.

(30) Foreign Application Priority Data

Feb. 8, 2005 (JP) ................................. 2005-032339

(51) Int. Cl.
*H01C 7/10*    (2006.01)

(52) U.S. Cl. .................. 338/22 R; 338/225; 338/332

(58) Field of Classification Search ............... 338/22 R, 338/22 SD, 225, 262, 324, 332
See application file for complete search history.

(56) References Cited

U.S. PATENT DOCUMENTS 5,635,485 A    6/1997    Agouridas et al.

FOREIGN PATENT DOCUMENTS

| CN | 1088709 A | 6/1994 |
|---|---|---|
| JP | 63-315550 A | 12/1988 |
| JP | 63-315555 A | 12/1988 |
| JP | 63-315556 A | 12/1988 |
| JP | 07-235405 A | 9/1995 |

OTHER PUBLICATIONS

Miura et al.; "Surface-Mount Negative-Characteristic Thermistor"; U.S. Appl. No. 11/835,272, filed Aug. 7, 2007.
Official Communication issued in corresponding Chinese Patent Application No. 200680004097.7, mailed on Jun. 13, 2010.

*Primary Examiner* — Kyung Lee
(74) *Attorney, Agent, or Firm* — Keating & Bennett, LLP

(57) ABSTRACT

A surface-mount negative-characteristic thermistor includes a ceramic body composed of a semiconductor ceramic material including at least one of Mn, Ni, and Ti; external electrodes disposed on surfaces of the ceramic body; and plating films disposed on surfaces of the external electrodes. When the molar quantity of Mn in the semiconductor ceramic material is represented by a and when the molar quantity of Ni in the semiconductor ceramic material is represented by b, the molar ratio of Mn to Ni is in the range of $55/45 \leq a/b \leq 90/10$, and when the total molar quantity of Mn and Ni in the semiconductor ceramic material is defined as 100 parts by mole, the content of Ti is in the range of about 0.5 parts by mole to about 25 parts by mole.

7 Claims, 1 Drawing Sheet

SURFACE-MOUNT NEGATIVE-CHARACTERISTIC THERMISTOR

BACKGROUND OF THE INVENTION

1. Field of the Invention

The present invention relates to a surface-mount negative-characteristic thermistor including plating films arranged on surfaces of external electrodes and suitable for being mounted on a substrate.

2. Description of the Related Art

In recent years, surface-mount electronic components have been required, and there have been advances in the fabrication of negative-characteristic thermistors in chip form, the thermistors having negative resistance temperature characteristics. In such negative-characteristic thermistor chips, for example, Japanese Unexamined Patent Application Publication No. 2004-104093 discloses a laminated negative-characteristic thermistor having a ceramic body containing Mn, Ni, and Al and having satisfactory reliability and a small change in properties with time.

The laminated negative-characteristic thermistor disclosed in Japanese Unexamined Patent Application Publication No. 2004-104093 will be described below with reference to FIG. 3. FIG. 3 is a schematic cross-sectional view of the laminated negative-characteristic thermistor disclosed in Japanese Unexamined Patent Application Publication No. 2004-104093. The laminated negative-characteristic thermistor 11 includes a ceramic body 14 having a plurality of ceramic layers 12 having negative resistance temperature characteristics; and a plurality of internal electrodes 13 disposed along interfaces between adjacent ceramic layers. External electrodes 15 are disposed on ends of the ceramic body 14 and connected to the internal electrodes 13. The ceramic layers 12 are each composed of a ceramic material containing Mn and Ni as main constituents and Al as an additive. The internal electrodes are each composed of Pd. The external electrodes are each composed of Ag.

The laminated negative-characteristic thermistor 11 is produced by a known method described below. An organic binder is mixed with a ceramic powder to form a slurry. The slurry is formed into ceramic green sheets by a doctor blade method or the like. A paste for forming internal electrodes and mainly containing Pd is applied to the ceramic green sheets by screen printing to form electrode patterns. The ceramic green sheets with the electrode patterns formed thereon by screen printing are laminated, held by the ceramic green sheets on which the electrode patterns are not formed by screen printing, and press-bonded to form a laminate. The resulting laminate is degreased and sintered to form the ceramic body 14 in which the internal electrodes 13 and the ceramic layers 12 are alternately laminated. A paste for forming external electrodes and containing Ag is applied to both ends of the resulting ceramic body 14 and baked to form the external electrodes 15.

When the resulting ceramic body 14 provided with the external electrodes 15 is surface-mounted on a substrate, soldering is usually performed. During soldering, the external electrodes 15 are melted and become eroded by solder, i.e., solder leaching may occur. To prevent solder leaching or to ensure solder wettability, plating films composed of Ni, Sn, or the like are generally formed on the external electrodes before soldering.

However, during forming of the plating films on the external electrodes 15 disposed on the ends of the ceramic body 14, a plating solution is disadvantageously in contact with the ceramic body 14 and erodes the ceramic body 14. The erosion of the ceramic body 14 due to the plating solution disadvantageously reduces the strength of the ceramic body 14. In particular, the ceramic body 14 composed of the material for a thermistor, the material containing Mn and Ni as main constituents and Al as shown in Japanese Unexamined Patent Application Publication No. 2004-104093, has excellent reliability and only small changes in properties over time, whereas the ceramic body cannot sufficiently prevent erosion due to the plating solution. Thus, to prevent the erosion due to the plating solution, a technique for providing an insulating protective layer, such as a glass layer, on a surface of the ceramic body 14 may be employed (for example, Japanese Unexamined Patent Application Publication No. 6-231906).

However, even when the glass layer is formed on the surface of the ceramic body 14, the plating solution may penetrate into the ceramic body 14 through minute cracks and pinholes present in the glass layer. Hence, the erosion of the ceramic body 14 is not sufficiently prevented. Furthermore, in the case of the formation of the glass layer, it is necessary to perform an additional step of forming the glass layer on the surface of the ceramic body 14, disadvantageously complicating a production process.

SUMMARY OF THE INVENTION

In order to overcome the problems described above, preferred embodiments of the present invention provide a surface-mount negative-characteristic thermistor having excellent reliability and preventing erosion due to a plating solution without the need for formation of a glass layer.

To achieve the advantages described above and to overcome the problems with the prior art, the inventors have conducted intensive studies and have discovered that in a ceramic body composed of a semiconductor ceramic material containing Mn as an essential constituent and at least one of Ni and Co, the inclusion of Ti in an amount within a predetermined range with respect to combinations of Mn, Ni, and Co can prevent erosion due to a plating solution without the need for formation of an insulating protective layer, such as a glass layer, on the ceramic body and provides a high-reliability surface-mount negative-characteristic thermistor.

A surface-mount negative-characteristic thermistor according to a first preferred embodiment of the present invention includes a ceramic body composed of a semiconductor ceramic material containing Mn, Ni, and Ti; external electrodes disposed on surfaces of the ceramic body; and plating films disposed on the external electrodes, wherein when the molar quantity of Mn in the semiconductor ceramic material is represented by a and when the molar quantity of Ni in the semiconductor ceramic material is represented by b, the molar ratio of Mn to Ni is in the range of $55/45 \leq a/b \leq 90/10$, and wherein when the total molar quantity of Mn and Ni in the semiconductor ceramic material is defined as 100 parts by mole, the content of Ti is in the range of about 0.5 parts by mole to about 25 parts by mole.

In a surface-mount negative-characteristic thermistor according to a second preferred embodiment of the present invention, when the molar quantity of Mn in the semiconductor ceramic material is represented by a and when the molar quantity of Ni in the semiconductor ceramic material is represented by b, the molar ratio of Mn to Ni is preferably in the range of $55/45 \leq a/b \leq 78.5/21.5$, and when the total molar quantity of Mn and Ni in the semiconductor ceramic material is defined as 100 parts by mole, the content of Ti is preferably in the range of about 5.0 parts by mole to about 25 parts by mole.

In a surface-mount negative-characteristic thermistor according to a third preferred embodiment of the present invention, the molar ratio of Mn to Ni described in the second invention is preferably in the range of $55/45 \leq a/b \leq 70/30$.

A surface-mount negative-characteristic thermistor according to a fourth preferred embodiment of the present invention includes a ceramic body composed of a semiconductor ceramic material containing Mn, Co, and Ti; external electrodes disposed on surfaces of the ceramic body; and plating films disposed on the external electrodes, wherein when the molar quantity of Mn in the semiconductor ceramic material is represented by a and when the molar quantity of Co in the semiconductor ceramic material is represented by c, the molar ratio of Mn to Co is in the range of $10/90 \leq a/c \leq 70/30$, and wherein when the total molar quantity of Mn and Co in the semiconductor ceramic material is defined as 100 parts by mole, the content of Ti is in the range of about 1 part by mole to about 30 parts by mole.

In a surface-mount negative-characteristic thermistor according to a fifth preferred embodiment of the present invention, when the molar quantity of Mn in the semiconductor ceramic material is represented by a and when the molar quantity of Co in the semiconductor ceramic material is represented by c, the molar ratio of Mn to Co is preferably in the range of $30/70 \leq a/c \leq 40/60$, and when the total molar quantity of Mn and Co in the semiconductor ceramic material is defined as 100 parts by mole, the content of Ti is preferably in the range of about 3 parts by mole to about 30 parts by mole.

A surface-mount negative-characteristic thermistor according to a sixth preferred embodiment of the present invention includes a ceramic body composed of a semiconductor ceramic material containing Mn, Ni, Co, and Ti; external electrodes disposed on surfaces of the ceramic body; and plating films disposed on the external electrodes, wherein the semiconductor ceramic material is composed of Mn, Ni, Co, and Ti, the content of Mn is in the range of about 0.1 mol % to about 90 mol %, the content of Ni is in the range of about 0.1 mol % to about 45 mol %, and the content of Co is in the range of about 0.1 mol % to about 90 mol % (provided that the sum of Mn, Ni, and Co is 100 mol %), and wherein when the total molar quantity of Mn, Ni, and Co in the semiconductor ceramic material is defined as 100 parts by mole, the content of Ti is in the range of about 0.5 parts by mole to about 30 parts by mole.

In a surface-mount negative-characteristic thermistor according to a seventh preferred embodiment of the present invention, when the total molar quantity of Mn and Ni in the above-described semiconductor ceramic material is defined as 100 parts by mole, the thermistor further comprises Fe in the range of about 5 parts by mole to about 20 parts by mole.

In a surface-mount negative-characteristic thermistor according to an eighth preferred embodiment of the present invention, when the total molar quantity of Mn and Ni in the above-described semiconductor ceramic material is defined as 100 parts by mole, the thermistor further comprises Cu in the range of about 3 parts by mole to about 7 parts by mole.

In a surface-mount negative-characteristic thermistor according to a ninth preferred embodiment of the present invention, when the total molar quantity of Mn and Co in the above-described semiconductor ceramic material is defined as 100 parts by mole, the thermistor further comprises Fe in the range of about 7 parts by mole to about 31 parts by mole.

In a surface-mount negative-characteristic thermistor according to a tenth preferred embodiment of the present invention, when the total molar quantity of Mn and Co in the above-described semiconductor ceramic material is defined as 100 parts by mole, the thermistor further comprises Cu in the range of about 2 parts by mole to about 7 parts by mole.

In a surface-mount negative-characteristic thermistor according to an eleventh preferred embodiment of the present invention, when the total molar quantity of Mn, Ni, and Co in the above-described semiconductor ceramic material is defined as 100 parts by mole, the thermistor further comprises Fe in the range of about 5 parts by mole to about 30 parts by mole.

In a surface-mount negative-characteristic thermistor according to a twelfth preferred embodiment of the present invention, when the total molar quantity of Mn, Ni, and Co in the above-described semiconductor ceramic material is defined as 100 parts by mole, the thermistor further comprises Cu in the range of about 1 part by mole to about 5 parts by mole.

In a surface-mount negative-characteristic thermistor according to a thirteenth preferred embodiment of the present invention, preferably, internal electrodes are embedded in the ceramic body, and the internal electrodes are electrically connected to the external electrodes.

In a surface-mount negative-characteristic thermistor according to a fourteenth preferred embodiment of the present invention, preferably, the internal electrodes are each composed of Ag—Pd, and the content of Ag is in the range of about 60% to about 90%.

When Mn and Ni are main constituents, and when Ti is contained, it is found that the structure of the first preferred embodiment of the present invention sufficiently prevents erosion due to a plating solution without the need for the formation of an insulating protective layer, such as a glass layer, on the ceramic body and results in the high-reliability surface-mount negative-characteristic thermistor. The structure of the second preferred embodiment of the present invention further prevents the erosion due to the plating solution. The third preferred embodiment of the present invention further improves reliability.

When Mn and Co are main constituents, and when Ti is contained, it is also found that the structure of the fourth preferred embodiment of the present invention sufficiently prevents the erosion of the ceramic body due to the plating solution without the need for the formation the insulating protective layer such as the glass layer, on the ceramic body and results in the high-reliability surface-mount negative-characteristic thermistor. The structure of the fifth preferred embodiment of the present invention further prevents the erosion due to the plating solution to improve reliability.

When Mn, Ni, and Co are main constituents, and when Ti is contained, the structure of the sixth preferred embodiment of the present invention sufficiently prevents the erosion due to the plating solution without the need for the formation of the insulating protective layer, such as the glass layer, on the surface of the ceramic body and results in high-reliability surface-mount negative-characteristic thermistor.

As new discoveries, the structure of each of the first to twelfth preferred embodiments of the present invention improves the sinterability of the ceramic body. For example, it is found that even at a low sintering temperature of about 900° C. to about 1,100° C., the surface-mount negative-characteristic thermistor having sufficient thermistor characteristics is obtained. Thus, even in the case of a laminated ceramic electronic component, which has internal electrodes in a ceramic body as described in the thirteenth preferred embodiment of the present invention, there is no need to use an expensive noble metal material, such as Pd or Pt, as an internal electrode material, and sufficient thermistor characteristics are obtained. Furthermore, even in the case of the surface-mount negative-characteristic thermistor including the internal electrode layers each having a high Ag content, i.e., each containing Ag in an amount within the range of about 60% to about 90% as described in the fourteenth preferred embodiment of the present invention, non-uniformity in resistance is reduced. Specifically, Ag has a melting point as low as approximately 960° C.; hence, when Ag is co-sintered with a semiconductor ceramic material having negative resistance-temperature characteristics, Ag disperses before sintering the semiconductor ceramic material, thereby reducing the coverage of the internal electrodes. This is disadvantageously liable to cause non-uniformity in the resistance of the negative-characteristic thermistor. In various preferred embodiments of the present invention, the use of the semiconductor ceramic material capable of being co-sintered with ceramic layers at a low sintering temperature of, for example, about 900° C. to about 1,100° C. results in a negative-characteristic thermistor having only small non-uniformity in resistance.

Other features, elements, steps, characteristics and advantages of the present invention will be described below with reference to preferred embodiments thereof and the attached drawings.

DETAILED DESCRIPTION OF PREFERRED EMBODIMENTS

A surface-mount negative-characteristic thermistor according to a first preferred embodiment of the present invention will be described in detail below on the basis of the drawings.

Figure 1:
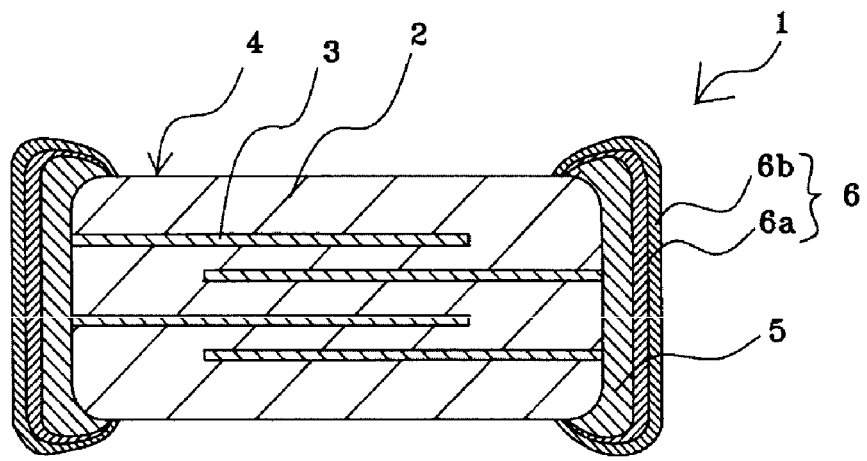
FIG. 1 is a schematic cross-sectional view of a surface-mount negative-characteristic thermistor according to a preferred embodiment of the present invention.

FIG. 1 is a schematic cross-sectional view of a surface-mount negative-characteristic thermistor. A surface-mount negative-characteristic thermistor 1 according to a preferred embodiment of the present invention preferably includes internal electrodes 3 disposed in a ceramic body 4 composed of a sintered semiconductor ceramic material having negative resistance temperature characteristics. In this case, the ceramic body 4 has a structure in which ceramic layers 2 and the internal electrodes 3 are alternately laminated. The internal electrodes 3 extend alternately to end surfaces of the ceramic body 4.

External electrodes 5 are disposed on the end surfaces of the ceramic body 4 so as to be electrically connected to the extending internal electrodes 3. Surfaces of the external electrodes 5 are overlaid with plating films 6.

The semiconductor ceramic materials used for the ceramic body 4 according to various preferred embodiments of the present invention are broadly categorized into semiconductor ceramic materials (1) to (3) described below:

(1) a semiconductor ceramic material containing Mn, Ni, and Ti, wherein when the molar quantity of Mn is represented by a and when the molar quantity of Ni is represented by b, the molar ratio of Mn to Ni is in the range of $55/45 \leq a/b \leq 90/10$, and wherein when the total molar quantity of Mn and Ni is defined as 100 parts by mole, the content of Ti is in the range of about 0.5 parts by mole to about 25 parts by mole;

(2) a semiconductor ceramic material containing Mn, Co, and Ti, wherein when the molar quantity of Mn is represented by a, and when the molar quantity of Co is represented by c, the molar ratio of Mn to Co is in the range of $10/90 \leq a/c \leq 70/30$, and wherein when the total molar quantity of Mn and Co is defined as 100 parts by mole, the content of Ti is in the range of about 1 part by mole to about 30 parts by mole; and (3) a semiconductor ceramic material containing Mn, Ni, Co, and Ti, wherein the content of Mn is in the range of about 0.1 mol % to about 90 mol %, the content of Ni is in the range of about 0.1 mol % to about 45 mol %, and the content of Co is in the range of about 0.1 mol % to about 90 mol % (wherein the sum of the contents of Mn, Ni, and Co is 100 mol %), and wherein when the total molar quantity of Mn, Ni, and Co is defined as 100 parts by mole, the content of Ti is in the range of about 0.5 parts by mole to about 30 parts by mole.

As described in the semiconductor ceramic materials (1) to (3), it is found that the incorporation of a predetermined amount of Ti into a semiconductor ceramic material containing Mn and at least one of Ni and Co prevents the erosion of the ceramic body due to a plating solution and improves the strength of the ceramic body.

In Japanese Unexamined Patent Application Publication No. 2004-104093, the use of a semiconductor ceramic material containing Mn and Ni as main constituents and containing Al requires a sintering temperature of at least 1,250° C. in order to sinter the ceramic body because Al is resistant to sintering. In various preferred embodiments of the present invention, it is found that the inclusion of Ti in an amount within a predetermined range in place of Al enables a ceramic body to be sintered at a lower sintering temperature, such as about 900° C. to about 1,100° C., and that the resulting ceramic body has excellent thermistor characteristics and reliability comparable with the case where Al is contained. In addition, it is found that in a structure in which a ceramic body includes internal electrodes, i.e., in a negative-characteristic thermistor having a laminated structure, even when low-melting-point internal electrodes each having a Ag content of about 60% to about 90% are co-sintered with ceramic layers, excellent negative resistance-temperature characteristics are obtained.

According to various preferred embodiments of the present invention, it is found that the formation of hetero-phases, e.g., a rock-salt phase, different from a spinel phase can be inhibited, thereby suppressing a shift in the composition of the spinel phase after sintering from an initial composition and preventing a reduction in strength due to the formation of the hetero-phase. Specifically, for example, in the case of the semiconductor ceramic material (1), when a thermistor material mainly containing Mn and Ni is sintered, spinel phases of Mn and Ni are generally formed. However, it is know that when sintering is performed at a high temperature of, for example, about 1,250° C., a hetero-phase such as a NiO phase which is a rock-salt phase, is excessively precipitated and segregates separately from the spinel phase. The formation of the NiO phase may rapidly increase resistivity and a B constant in response to a change in sintering temperature to cause a shift in composition and may significantly shift the composition of the spinel phase in a sintered body from the initial composition. Such a NiO phase differs in thermal expansion coefficient from the spinel phase, thus disadvantageously causing the occurrence of cracks during sintering and processing, and reducing the strength of the ceramic body. In the structure of various preferred embodiments of the present invention, however, low-temperature sintering can be performed. In addition, for example, even when sintering is performed at a high temperature, the formation of the NiO phase can be prevented. Thereby, preferred embodiments of the present invention can prevent the reduction in the strength of the ceramic body. Also in cases of a semiconductor ceramic material mainly containing Mn and Co and a semiconductor ceramic material mainly containing Mn, Co, and Ni, a hetero-phase, such as a rock-salt phase, different from the spinel phase is formed. Thus, by satisfying the relationship described in the semiconductor ceramic material (2) or the semiconductor ceramic material (3), the formation of the hetero-phase can be prevented.

The reason why composition ranges of the semiconductor ceramic materials described in the items (1) to (3) are limited will be described below.

In the semiconductor ceramic material (1), when the molar quantity of Mn is represented by a, and when the molar quantity of Ni is represented by b, the molar ratio of Mn to Ni is preferably in the range of $55/45 \leqq a/b \leqq 90/10$. The reason for this is as follows: when a/b exceeds 90/10, the ceramic body is insulated. Hence, a desired effect for the application as a negative-characteristic thermistor is not obtained. When a/b is less than about 55/45, a large amount of the hetero-phase such as the NiO phase is formed to reduce the strength of the ceramic body, thereby possibly generating cracks during processing the ceramic body.

In the semiconductor ceramic material (1), when the total molar quantity of Mn and Ni is defined as 100 parts by mole, the content of Ti is in the range of about 0.5 parts by mole to about 25 parts by mole. A Ti content of less than about 0.5 parts by mole cannot sufficiently prevent the erosion of the ceramic body by plating. As a result, a large amount of the NiO phase is formed, thereby reducing the strength of the ceramic body. A Ti content exceeding about 25 parts by mole results in excessively high resistivity and thus is not preferred.

The case where the molar ratio of Mn to Ni is in the range of $55/45 \leqq a/b \leqq 78.5/21.5$ and where the content of Ti is in the range of about 5 parts by mole to about 25 parts by mole when the total molar quantity of Mn and Ni in the semiconductor ceramic material is defined as 100 parts by mole is preferred because the erosion of the ceramic body due to a plating solution can be further prevented. In particular, the case where the molar ratio of Mn to Ni is in the range of $55/45 \leqq a/b \leqq 70/30$ and where the content of Ti is in the range of about 5 parts by mole to about 25 parts by mole when the total molar quantity of Mn and Ni in the semiconductor ceramic material is defined as 100 parts by mole is preferred because further improved reliability is obtained.

In the semiconductor ceramic material (2), when the molar quantity of Mn is represented by a, and when the molar quantity of Co is represented by c, the molar ratio of Mn to Co is in the range of $10/90 \leqq a/c \leqq 70/30$. The reason for this is as follows: when a/c exceeds 70/30, the ceramic body is insulated. Hence, a desired effect for the application as a negative-characteristic thermistor is not obtained. When a/c is less than about 10/90, the ceramic body is also insulated. Hence, a desired effect for the application as a negative-characteristic thermistor is not obtained.

In the semiconductor ceramic material (2), when the total molar quantity of Mn and Co is defined as 100 parts by mole, the content of Ti is in the range of about 1 part by mole to about 30 parts by mole. A Ti content of less than about 1 part by mole cannot sufficiently prevent the erosion of the ceramic body by plating. As a result, a large amount of the hetero-phase is formed, thereby reducing the strength of the ceramic body. A Ti content exceeding about 30 parts by mole results in excessively high resistivity and thus is not preferred.

The case where the molar ratio of Mn to Co is in the range of $30/70 \leqq a/c \leqq 40/60$ and where the content of Ti is in the range of about 3 parts by mole to about 30 parts by mole when the total molar quantity of Mn and Co is defined as 100 parts by mole is more preferred because the erosion of the ceramic body due to the plating solution can be further prevented and excellent reliability is obtained.

In the semiconductor ceramic material (3), a Mn content exceeding about 90 mol % results in excessively high resistivity and eliminates usefulness as a thermistor. A Mn content of less than about 0.1 mol % does not show an addition effect. A Ni content exceeding about 45 mol % results in the formation of a large amount of the hetero-phase, a reduction in the strength of the body, and significant non-uniformity in initial characteristics, thus being not preferred. A Ni content of less than about 0.1 mol % does not show an addition effect. A Co content exceeding about 90 mol % results in excessively high resistivity and eliminates usefulness as a thermistor. A Co content of less than about 0.1 mol % does not show an addition effect.

In the semiconductor ceramic material (3), when the total molar quantity of Mn, Ni, and Co is defined as 100 parts by mole, the content of Ti is in the range of about 0.5 parts by mole to about 30 parts by mole. A Ti content of less than about 0.5 parts by mole cannot sufficiently prevent the erosion of the ceramic body by plating. As a result, a large amount of the hetero-phase is formed, thereby reducing the strength of the ceramic body. A Ti content exceeding about 30 parts by mole results in excessively high resistivity and thus is not preferred.

The case where the Mn content is in the range of about 25 mol % to about 65 mol %, the Ni content is in the range of about 5 mol % to about 30 mol %, and the Co content is in the range of about 5 mol % to about 70 mol % (provided that the sum of Mn, Ni, and Co is 100 mol %) and where the Ti content is in the range of about 0.5 parts by mole to about 30 parts by mole when the total molar quantity of Mn, Ni, and Co in the semiconductor ceramic material is defined as 100 parts by mole is more effective.

A transition metal element, such as Fe or Cu, may be included as an additive as long as the relationship described in any one of the semiconductor ceramic materials (1) to (3) according to various preferred embodiments of the present invention is satisfied. For example, the content of Fe reduces the non-uniformity in initial resistance. The content of Cu permits sintering at a lower temperature, thereby improving denseness of the ceramic body. Note that the content of Zn is not preferred because plating resistance may degrade due to easy erosion of Zn by a plating solution.

The semiconductor ceramic layers 2 composed of any one of the semiconductor ceramic materials (1) to (3) according to various preferred embodiments of the present invention may contain impurities from starting materials or included during a production process. Examples of the impurities include Si, Na, K, Ca, and Zr. It is found that the content of the impurities is about 1,000 ppm or less or at most about 5,000 ppm or less. Hence, in preferred embodiments of the present invention, the impurities do not affect the characteristics.

Non-limiting examples of materials used for the internal electrodes 3 according to preferred embodiments of the present invention include elementary substances, such as Ag, Pd and Ag—Pd; and alloys thereof. In particular, in preferred embodiments of the present invention, the internal electrodes each composed of Ag—Pd and having an Ag content of about 60 percent by weight to about 90 percent by weight can be sufficiently used. That is, the semiconductor ceramic material according to various preferred embodiments of the present invention can be sintered at a low temperature, for example, about 900° C. to about 1,100° C. Thus, even when the internal electrodes 3 each composed of a low-melting-point electrode material of Ag—Pd and having a Ag content of about 60 percent by weight to about 90 percent by weight are used, the internal electrodes 3 can be co-sintered with the semiconductor ceramic material. Hence, a negative-characteristic thermistor having only small nonuniformity in resistance is obtained. The present invention is not limited to such low-temperature sintering. It is to be understood that for example, even when the internal electrodes are composed of Pd and sintered at a high temperature of about 1,100° C. or higher, the erosion of the ceramic body by a plating solution can be prevented.

Preferably, the external electrodes 5 according to preferred embodiments of the present invention are each composed of an elementary substance, such as Ag, Pd, Ag—Pd or an alloy thereof. The use of such external electrodes further improves the connection with the internal electrodes each composed of Ag—Pd and electric continuity.

The plating films 6 can be appropriately changed in response to an affinity for a metal used for the external electrodes 5. When the external electrodes 5 are each composed of Ag, a Ni plating film 6a and a Sn plating film 6b are preferably used. In particular, when an acidic plating solution is used, the ceramic body 4 is easily eroded. Since the surface-mount negative-characteristic thermistor according to various preferred embodiments of the present invention has excellent plating resistance, even when the acidic plating solution is used, the erosion of the ceramic body 4 by the plating solution can be prevented.

In preferred embodiments of the present invention, the erosion of the ceramic body 4 by the plating solution can be prevented without the need for the formation of a protective layer such as a glass layer. However, the glass layer may be formed. That is, also in the case of the surface-mount negative-characteristic thermistor according to preferred embodiments of the present invention, for example, in order to be insusceptible to an external environment and to prevent the degradation of characteristics due to temperature, humidity, and the like, a glass layer may be formed on the surface of the ceramic body 4.

A method for producing the surface-mount negative-characteristic thermistor 1 according to a preferred embodiment of the present invention, the thermistor 1 having the ceramic body 4 composed of a semiconductor ceramic material containing Mn, Ni, and Ti, will be described below.

Predetermined amounts of $Mn_3O_4$, NiO, and $TiO_2$ as starting ceramic materials are weighed, placed into a ball mill containing grinding media such as zirconia balls, and sufficiently wet-ground. The resulting mixture is calcined at a predetermined temperature to form a ceramic powder. An organic binder is added to the ceramic powder. The resulting mixture is wet-mixed to form a slurry. The slurry is formed into ceramic green sheets by a doctor blade process.

A paste for forming internal electrodes, the paste being mainly composed of Ag—Pd, is applied to the ceramic green sheets by screen printing to form electrode patterns. The resulting ceramic green sheets having the electrode patterns formed by screen printing are laminated, held by ceramic green sheets not having the electrode patterns such that the protective ceramic green sheets were arranged on the top and bottom of the laminate, and press-bonded to form a laminate. The resulting laminate is cut into pieces having a predetermined size. The resulting pieces are placed in a zirconia sagger, degreased, and sintered at a predetermined temperature (e.g., about 900° C. to about 1,100° C.) to form the piezoelectric ceramic bodies 4 each including the ceramic layers 2 and the internal electrodes 3 that are alternately laminated.

A paste containing Ag and the like for forming external electrodes is applied to both ends of each ceramic body 4 and baked to form the external electrodes 5. The plating films 6a and 6b composed of, for example, Ni and Sn are formed on surfaces of the external electrodes 5 by electrolytic plating. Thereby, a surface-mount negative-characteristic thermistor according to a first preferred embodiment of the present invention is produced. The external electrodes 5 may have satisfactory adhesion and may be formed by a thin-film-forming method, such as sputtering or vacuum evaporation.

In this preferred embodiment, oxides such as $Mn_3O_4$ as the starting ceramic materials are used. Alternatively, for example, a carbonate or a hydroxide of Mn may be used. Also in the case of the semiconductor ceramic material (2) and the semiconductor ceramic material (3), the same method as the above-described method may preferably be used.

The surface-mount negative-characteristic thermistor according to a preferred embodiments of the present invention is useful for temperature compensation and temperature detection but is not limited thereto. Furthermore, the present invention is not limited to the laminated type as long as the thermistor is surface mount, i.e., the thermistor has external electrodes disposed on surfaces of the ceramic body chip so as to be surface-mounted on a substrate, the external electrodes having plating films disposed on surfaces of the external electrodes. The laminated negative-characteristic thermistor according to various preferred embodiments of the present invention will be described in further detail below.

Example 1

$Mn_3O_4$, NiO, and $TiO_2$ were prepared as starting materials. The materials were mixed such that the resulting mixtures satisfy compositions of Samples 1 to 54 shown in Table 1. The content of Ti shown in Table 1 is the amount of Ti added (part by mole) when the total molar quantity of Mn and Ni is defined as 100 parts by mole.

Deionized water and a polycarboxylic acid dispersant were added to the starting materials. The resulting mixture was mixed and pulverized with media of zirconia balls, dried, calcined at approximately 800° C. for about 2 hours, and pulverized again with a ball mill to form a calcined powder. Next, about 40 percent by weight of water and about 2.0 percent by weight of polycarboxylic acid dispersant were added to the resulting calcined powder. The resulting mixture was mixed for about 24 hours, and then about 25 percent by weight of an acrylic organic binder and about 0.75 percent by weight of polyoxyethylene as a plasticizer were added and mixed for about 2 hours to form a ceramic slurry.

The resulting ceramic slurry was formed into sheets by a doctor blade process and dried into a ceramic green sheet having a thickness of about 40 μm. The ceramic green sheet was cut into substantially rectangular segments. An Ag—Pd conductive paste for forming internal electrodes was prepared by dispersing a metal powder composed of a Ag—Pd alloy (composition: about 80 wt % of Ag and about 20 wt % of Pd) and an organic binder into an organic solvent. The Ag—Pd conductive paste for forming the internal electrodes was applied to a main surface of each ceramic green sheet segment by screen printing. The ceramic green sheet segments were laminated such that the Ag—Pd conductive paste layers to be formed into the internal electrodes were opposed to each other. The resulting laminated body was held by protective ceramic green sheets that were not provided with the Ag—Pd conductive paste for forming the internal electrodes such that the protective ceramic green sheets were arranged on the top and bottom of the laminate. The resulting laminate was press-bonded and cut into green laminates each having a length of about 1.2 mm, a width of about 0.6 mm, and a thickness of about 0.6 mm. The green laminates were degreased in air at approximately 350° C. for about 10 hours and sintered in air at approximately 1,000° C. for about 2 hours to form the ceramic bodies 4 each including the ceramic layers 2 and the internal electrodes 3 that were alternately laminated.

An Ag conductive paste for forming external electrodes was prepared by dispersing an Ag powder and an organic binder into an organic solvent. The Ag conductive paste for forming the external electrodes was applied to both ends of each ceramic body so as to be electrically connected to the internal electrodes, and baked to form the external electrodes 5.

The Ni plating film 6a and the Sn plating film 6b were sequentially formed by electrolytic plating on surfaces of the external electrodes of the ceramic body 4 having the external electrodes 5 to form the surface-mount negative-characteristic thermistors 1 of Samples 1 to 54.

A laminated negative-characteristic thermistor produced by the same method as in Sample 15 was used as REFERENCE EXAMPLE, except that $Al_2O_3$ was used in place of $TiO_2$, a Ag—Pd alloy (composition: about 30 wt % of Ag and about 70 wt % of Pd) was used as the internal electrodes, and the sintering temperature was approximately 1,300° C. In the laminated negative-characteristic thermistors of Samples 1 to 54 and REFERENCE EXAMPLE, composition analysis was performed on the ceramic bodies by inductively coupled plasma-atomic emission spectroscopy (ICP-AES). The results demonstrated that the compositions of the resulting ceramic bodies were equal to initial compositions thereof.

In the resulting laminated negative-characteristic thermistors of Samples 1 to 54, the number of each Sample was 100. Characteristic evaluation was performed as follows. Table 1 shows the results.

Figure 2:
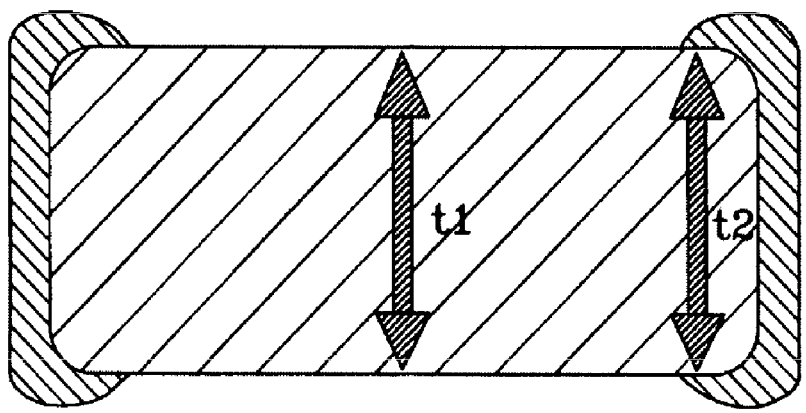
FIG. 2 is a schematic view showing a method for measuring the percentage of erosion by plating of a surface-mount negative-characteristic thermistor according to a preferred embodiment of the present invention.
Figure 3:
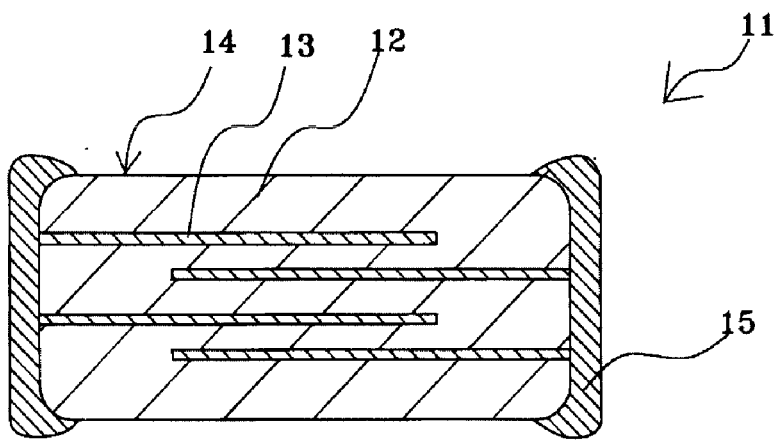
FIG. 3 is a schematic cross-sectional view of a known laminated negative-characteristic ceramic electronic component.

The percentage of erosion of by plating, which represents the percentage of the erosion of the ceramic body due to a plating solution, was measured by the following method: as shown in FIG. 2, when the thickness at the longitudinal center of the ceramic body in the laminating direction was represented by t1, and when the thickness of a portion of the ceramic body in the laminating direction, the portion being covered with the external electrode and not in contact with the plating solution was represented by t2, the percentage of erosion expressed as Formula 1 described below was defined as the percentage of erosion by plating.

$$\text{Percentage of erosion by plating}(\%) = (t2-t1)/t2 \times 100 \tag{1}$$

With respect to transverse strength showing the strength of the ceramic body, a transverse strength test was performed on the laminated negative-characteristic thermistors of Samples 1 to 54 according to JIS C 2570.

With respect to reliability, a high-temperature shelf test was performed, and changes with time were calculated with Formula 2 described below. That is, the negative-characteristic thermistors were left standing in a constant temperature oven at approximately 125° C. for about 1,000 hours. After natural cooling, resistance at approximately 25° C. was determined. A change in resistance at approximately 25° C. before and after the shelf test was represented by $\Delta R_{25}$. Resistance at approximately 25° C. before the shelf test at approximately 125° C. was represented by $R_{25}$. The ratio of $\Delta R_{25}$ to $R_{25}$, i.e., $\Delta R_{25}/R_{25}$, was calculated.

$$\Delta R_{25}/R_{25}(\%) = (R_{25}(\text{after shelf test at approximately } 125° \text{C. for about } 1{,}000\ h) - R_{25}(\text{before shelf test}))/R_{25}(\text{before shelf test}) \tag{2}$$

The percentage of pore areas was measured as an index of sinterability. The percentage of the pore areas was measured as follows: after the resulting ceramic body of each sample was immersed in a resin, mirror polishing was performed in the direction parallel to an end surface of the ceramic body. Observation was made with a scanning electron microscope (SEM). The sum of the pore areas was determined by image analysis, and the percentage of the pore areas was calculated.

Resistance measurement was performed at approximately 25° C. to determine room temperature resistance ($R_{25}$). Resistance measurement was performed at approximately 50° C. to determine resistance ($R_{50}$) at approximately 50° C., and then a B constant ($B_{25/50}$) was calculated. The B constant was calculated with Formula (3) using resistance $R_{25}$ at approximately 25° C. and resistance $R_{50}$ at approximately 50° C. In addition, 3CV (%) showing non-uniformity in the B constant of each negative-characteristic thermistor was calculated with Formula (4).

$$B\ \text{constant}(K) = [\ln R_{25}(\Omega) - \ln R_{50}(\Omega)]/(1/298.15 - 1/323.15) \tag{3}$$

$$B\ \text{constant}\ 3CV(\%) = \text{standard deviation} \times 300/\text{mean of } B\ \text{constant} \tag{4}$$

With respect to resistivity, single-plate ceramic bodies not including the internal electrodes and negative-characteristic thermistors including Ag external electrodes disposed on both main surfaces of each of the ceramic bodies are prepared as samples produced by the same production conditions as in Samples 1 to 54. Resistance of these samples was measured. The measured resistance values were defined as resistivity of the ceramic materials.

TABLE 1

| Sample | Mn mol | Ni mol | Ti part by mol | Percentage of erosion by plating % | Transverse strength N | Percentage of pore area % | ΔR/R % | Resistivity kΩcm | B constant K | 3CV % |
|---|---|---|---|---|---|---|---|---|---|---|
| *1  | 92.0 | 8.0  | 5.0 | 2.1 | 60.1 | 1.1 | —    | —     | —    | —    |
| 2   | 90.0 | 10.0 | 5.0 | 1.6 | 64.2 | 1.1 | 0.10 | 526.3 | 5031 | 0.14 |
| 3   | 86.5 | 13.5 | 5.0 | 1.3 | 68.5 | 1.3 | 0.12 | 119.9 | 4561 | 0.14 |
| 4   | 82.5 | 17.5 | 5.0 | 1.2 | 66.1 | 1.2 | 0.32 | 10.5  | 4238 | 0.13 |
| 5   | 78.5 | 21.5 | 5.0 | 0.9 | 62.7 | 0.9 | 0.52 | 5.7   | 4148 | 0.14 |
| 6   | 74.5 | 25.5 | 5.0 | 0.9 | 59.4 | 0.7 | 0.89 | 6.3   | 4061 | 0.16 |
| 7   | 70.5 | 29.5 | 5.0 | 0.9 | 55.4 | 0.6 | 1.32 | 6.6   | 4023 | 0.15 |
| 8   | 66.5 | 33.5 | 5.0 | 0.9 | 51.6 | 0.5 | 0.25 | 7.0   | 4027 | 0.17 |
| 9   | 62.5 | 37.5 | 5.0 | 0.8 | 47.9 | 0.2 | 0.09 | 8.4   | 4040 | 0.21 |
| 10  | 57.5 | 42.5 | 5.0 | 0.7 | 44.2 | 0.2 | 0.11 | 8.9   | 4044 | 0.26 |
| 11  | 55.0 | 45.0 | 5.0 | 0.7 | 32.1 | 0.2 | 0.16 | 9.1   | 4051 | 0.49 |
| *12 | 53.0 | 47.0 | 5.0 | 0.7 | 8.2  | 0.2 | 0.16 | 9.6   | 4063 | 0.87 |

TABLE 1-continued

| Sample | Mn mol | Ni mol | Ti part by mol | Percentage of erosion by plating % | Transverse strength N | Percentage of pore area % | ΔR/R % | Resistivity kΩcm | B constant K | 3CV % |
|---|---|---|---|---|---|---|---|---|---|---|
| *13 | 78.5 | 21.5 | 0.1 | 6.8 | 19.5 | 6.7 | 2.10 | 2.0 | 3971 | 0.48 |
| 14 | 78.5 | 21.5 | 0.5 | 3.6 | 31.6 | 4.8 | 1.33 | 2.6 | 3992 | 0.32 |
| 15 | 78.5 | 21.5 | 2.0 | 2.8 | 45.5 | 3.4 | 0.71 | 3.5 | 4066 | 0.15 |
| 16 | 78.5 | 21.5 | 5.0 | 0.9 | 62.7 | 0.9 | 0.52 | 5.7 | 4148 | 0.14 |
| 17 | 78.5 | 21.5 | 10.0 | 0.2 | 68.5 | 0.2 | 0.50 | 35.0 | 4354 | 0.13 |
| 18 | 78.5 | 21.5 | 16.0 | 0.1 | 70.1 | <0.1 | 0.49 | 117.2 | 4661 | 0.17 |
| 19 | 78.5 | 21.5 | 20.0 | 0.1 | 72.9 | <0.1 | 0.47 | 393.4 | 5022 | 0.23 |
| 20 | 78.5 | 21.5 | 25.0 | <0.1 | 69.3 | <0.1 | 0.49 | 912.1 | 5692 | 0.31 |
| *21 | 78.5 | 21.5 | 30.0 | <0.1 | 68.3 | <0.1 | — | — | — | — |
| *22 | 70.5 | 29.5 | 0.1 | 6.7 | 16.4 | 6.6 | 1.89 | 1.1 | 3789 | 0.39 |
| 23 | 70.5 | 29.5 | 1.0 | 2.9 | 34.3 | 2.9 | 1.11 | 2.4 | 3901 | 0.35 |
| 24 | 70.5 | 29.5 | 3.0 | 2.1 | 46.6 | 1.5 | 0.62 | 4.2 | 3966 | 0.23 |
| 25 | 70.5 | 29.5 | 5.0 | 0.9 | 55.4 | 0.6 | 1.32 | 6.6 | 4023 | 0.16 |
| 26 | 70.5 | 29.5 | 10.0 | 0.2 | 59.3 | 0.4 | 0.74 | 22.0 | 4257 | 0.11 |
| 27 | 70.5 | 29.5 | 20.0 | 0.1 | 63.2 | 0.2 | 0.51 | 100.1 | 4543 | 0.17 |
| 28 | 70.5 | 29.5 | 25.0 | <0.1 | 62.1 | <0.1 | 0.52 | 567.1 | 5153 | 0.22 |
| *29 | 70.5 | 29.5 | 30.0 | <0.1 | 60.2 | <0.1 | — | — | — | — |
| *30 | 66.5 | 33.5 | 0.1 | 6.2 | 15.9 | 5.9 | 1.01 | 1.1 | 3794 | 0.84 |
| 31 | 66.5 | 33.5 | 1.0 | 2.4 | 38.4 | 1.4 | 0.46 | 2.7 | 3910 | 0.46 |
| 32 | 66.5 | 33.5 | 3.0 | 1.6 | 48.5 | 0.9 | 0.34 | 4.6 | 3967 | 0.24 |
| 33 | 66.5 | 33.5 | 5.0 | 0.9 | 51.6 | 0.5 | 0.25 | 7.0 | 4027 | 0.18 |
| 34 | 66.5 | 33.5 | 10.0 | 0.1 | 58.9 | 0.2 | 0.11 | 21.5 | 4242 | 0.13 |
| 35 | 66.5 | 33.5 | 20.0 | <0.1 | 62.1 | 0.1 | 0.16 | 97.4 | 4507 | 0.11 |
| 36 | 66.5 | 33.5 | 25.0 | <0.1 | 60.3 | <0.1 | 0.18 | 563.4 | 5149 | 0.16 |
| *37 | 66.5 | 33.5 | 30.0 | <0.1 | 61.8 | <0.1 | — | — | — | — |
| *38 | 65.0 | 35.0 | 0.1 | 5.6 | 14.3 | 5.4 | 1.04 | 1.0 | 3782 | 0.87 |
| 39 | 65.0 | 35.0 | 0.5 | 2.8 | 32.3 | 3.3 | 0.64 | 2.4 | 3812 | 0.48 |
| 40 | 65.0 | 35.0 | 2.0 | 1.9 | 48.2 | 2.0 | 0.48 | 4.2 | 3862 | 0.38 |
| 41 | 65.0 | 35.0 | 5.0 | 0.9 | 52.3 | 0.5 | 0.36 | 6.9 | 4024 | 0.32 |
| 42 | 65.0 | 35.0 | 10.0 | 0.3 | 61.5 | 0.2 | 0.14 | 20.9 | 4225 | 0.24 |
| 43 | 65.0 | 35.0 | 16.0 | 0.1 | 63.3 | 0.1 | 0.10 | 96.6 | 4507 | 0.21 |
| 44 | 65.0 | 35.0 | 20.0 | <0.1 | 66.6 | <0.1 | 0.09 | 272.0 | 4696 | 0.19 |
| 45 | 65.0 | 35.0 | 25.0 | <0.1 | 67.7 | <0.1 | 0.08 | 561.8 | 5144 | 0.22 |
| *46 | 65.0 | 35.0 | 30.0 | <0.1 | 66.8 | <0.1 | — | — | — | — |
| *47 | 57.5 | 42.5 | 0.1 | 5.4 | 12.2 | 5.3 | 0.88 | 1.1 | 3802 | 0.95 |
| 48 | 57.5 | 42.5 | 1.0 | 1.9 | 30.1 | 1.1 | 0.33 | 3.0 | 3922 | 0.53 |
| 49 | 57.5 | 42.5 | 3.0 | 1.2 | 39.1 | 0.6 | 0.21 | 4.9 | 3981 | 0.40 |
| 50 | 57.5 | 42.5 | 5.0 | 0.7 | 44.2 | 0.2 | 0.11 | 8.9 | 4044 | 0.31 |
| 51 | 57.5 | 42.5 | 10.0 | 0.1 | 52.7 | 0.1 | 0.02 | 28.3 | 4282 | 0.22 |
| 52 | 57.5 | 42.5 | 20.0 | 0.1 | 59.0 | 0.1 | 0.09 | 114.9 | 4614 | 0.17 |
| 53 | 57.5 | 42.5 | 25.0 | <0.1 | 59.1 | <0.1 | 0.11 | 598.1 | 5114 | 0.18 |
| *54 | 57.5 | 42.5 | 30.0 | <0.1 | 60.7 | <0.1 | — | — | — | — |
| Reference example | 78.5 | 21.5 | Al 3.0 | 4.4 | 27.3 | 2.1 | 0.52 | 6.7 | 4036 | 0.41 |

*indicates the sample out of the range of the present invention

As is apparent from Table 1, in each of Samples 2 to 11, 14 to 20, 23 to 28, 31 to 36, 39 to 45, and 48 to 53, in which in the case where the molar quantity of Mn is represented by a and where the molar quantity of Ni is represented by b, the molar ratio of Mn to Ni is in the range of $55/45 \leq a/b \leq 90/10$, and in which the content of Ti is in the range of about 0.5 parts by mole to about 25 parts by mole when the total molar quantity of Mn and Ni in the semiconductor ceramic material is defined as 100 parts by mole, the results demonstrate that $\Delta R_{25}/R_{25}$ is about 1.5% or less, the percentage of erosion by plating is about 5% or less, and transverse strength is 30 N or more. Hence, the laminated negative-characteristic thermistor has a low percentage of erosion by plating and excellent transverse strength while having excellent reliability. The percentage of the pore areas is as small as about 5% or less. The results demonstrate that even at a low sintering temperature of approximately 1,000° C., each sample is sufficiently sintered and has sufficient B constant and resistivity. In each of Samples 5 to 11, 16 to 20, 25 to 28, 33 to 36, 41 to 45, and 50 to 53, in which the molar ratio of Mn to Ni is in the range of $55/45 \leq a/b \leq 78.5/21.5$ and in which the content of Ti is in the range of about 5.0 parts by mole to about 25 parts by mole when the total molar quantity of Mn and Ni in the semiconductor ceramic material is defined as 100 parts by mole, the results demonstrate that the percentage of erosion by plating is about 1% or less, which is more excellent. In each of Samples 8 to 11, 33 to 36, 41 to 45, and 50 to 53, in which the molar ratio of Mn to Ni is in the range of $55/45 \leq a/b \leq 70/30$ and in which the content of Ti is in the range of about 5.0 parts by mole to about 25 parts by mole when the total molar quantity of Mn and Ni in the semiconductor ceramic material is defined as 100 parts by mole, $\Delta R_{25}/R_{25}$, which indicates reliability, is about 0.4% or less. Hence, the more excellent laminated negative-characteristic thermistor is obtained.

On the other hand, in Reference Example in which Al is used in place of Ti, the results demonstrate that although reliability is about 0.52%, which is excellent, the percentage of erosion by plating is as large as about 4.4%, and transverse strength is as small as about 27.3 N. Sample 1 in which the molar ratio of Mn to Ni exceeds about 90/10 is not preferred because the ceramic body is insulated and thus the sample cannot be used as a negative-characteristic thermistor. In Sample 12 in which the molar ratio of Mn to Ni is less than about 55/45, Ni insoluble in the spinel phase is formed into a NiO phase. A large amount of the NiO phase is formed at portions other than the spinel phase, thus reducing the transverse strength of the ceramic body. In each of Samples 13, 22, 30, 38, and 47, in which the content of Ti is less than about 0.5 parts by mole when the total molar quantity of Mn and Ni is defined as 100 parts by mole, the results demonstrate the significant erosion of the ceramic body caused by the plating solution and low transverse strength due to the insufficient Ti content. In each of Samples 21, 29, 37, 46, and 54, in which the content of Ti exceeds about 25 parts by mole when the total molar quantity of Mn and Ni is defined as 100 parts by mole, the results demonstrate that the resistivity of the ceramic body exceeds a meaningful value as a commercial product.

measured with a wavelength-dispersive x-ray spectrometer (WDX) under the following conditions: a measurement size of approximately 40 μm×40 μm, the number of pixels of 250×250, the pixel size of about 0.16 μm, an acceleration voltage of about 15 kV, and an irradiation current of about 100 mA. The percentage of segregated portions of Ni, in other words, the percentage of areas of the NiO phase was calculated with (area of segregated portion of Ni/measurement area)×100(%). Table 2 shows the measurement results.

TABLE 2

| Sample | Mn mol | Ni mol | Ti part by mol | Percentage of rock salt phase area % | Percentage of erosion by plating % | Transverse strength N | Percentage of pore area % | ΔR/R % |
|---|---|---|---|---|---|---|---|---|
| *55 | 90.0 | 10.0 | 0.0 | 0.0 | 8.9 | 55.8 | 6.9 | — |
| *56 | 86.5 | 13.5 | 0.0 | 0.0 | 7.8 | 52.3 | 6.9 | 0.42 |
| *57 | 82.5 | 17.5 | 0.0 | 0.0 | 7.4 | 51.2 | 7.1 | 0.72 |
| *58 | 78.5 | 21.5 | 0.0 | 0.2 | 7.0 | 49.8 | 7.3 | 2.12 |
| *59 | 74.5 | 25.5 | 0.0 | 0.9 | 5.2 | 44.3 | 7.6 | 2.68 |
| 60 | 74.5 | 25.5 | 5.0 | 0.0 | 0.9 | 59.4 | 0.7 | 0.89 |
| *61 | 70.5 | 29.5 | 0.0 | 1.6 | 5.4 | 39.2 | 7.7 | 3.20 |
| 62 | 70.5 | 29.5 | 5.0 | 0.0 | 0.9 | 55.4 | 0.6 | 1.32 |
| *63 | 66.5 | 33.5 | 0.0 | 8.9 | 5.9 | 29.7 | 7.7 | 1.24 |
| 64 | 66.5 | 33.5 | 2.0 | 3.8 | 2.1 | 43.2 | 1.1 | 0.65 |
| 65 | 66.5 | 33.5 | 5.0 | 0.8 | 0.9 | 51.6 | 0.5 | 0.25 |
| *66 | 62.5 | 37.5 | 0 | 33.2 | 4.1 | 8.3 | 7.8 | 0.24 |
| 67 | 62.5 | 37.5 | 0.5 | 29.8 | 2.3 | 21.8 | 5.4 | 0.18 |
| 68 | 62.5 | 37.5 | 2 | 11.5 | 1.4 | 39.2 | 3.6 | 0.11 |
| 69 | 62.5 | 37.5 | 5 | 7.8 | 0.8 | 47.9 | 0.2 | 0.09 |
| 70 | 62.5 | 37.5 | 8 | 3.4 | 0.2 | 53.2 | <0.1 | 0.08 |
| 71 | 62.5 | 37.5 | 10 | 1.1 | <0.1 | 57.8 | <0.1 | 0.08 |
| 72 | 62.5 | 37.5 | 13 | 0.5 | <0.1 | 59.9 | <0.1 | 0.07 |
| 73 | 62.5 | 37.5 | 15 | 0.2 | <0.1 | 62.4 | <0.1 | 0.07 |
| 74 | 62.5 | 37.5 | 18 | 0.1 | <0.1 | 65.6 | <0.1 | 0.07 |

*indicates the sample out of the range of the present invention

Example 2

In surface-mount negative-characteristic thermistors each including a ceramic body composed of a semiconductor ceramic material containing Mn, Ni, and Ti, the relationship between the composition of the semiconductor ceramic material and the rate of the formation of the NiO phase, which is a hetero-phase, was investigated. $Mn_3O_4$, NiO, $TiO_2$ were prepared as starting materials and mixed in such a manner that the resulting mixtures satisfy compositions of Samples 55 to 74 shown in Table 2. The content of Ti shown in Table 2 is the amount of Ti added (part by mole) when the total molar quantity of Mn and Ni is defined as 100 parts by mole. Negative-characteristic thermistors of Samples 55 to 74 were produced by the same method as in EXAMPLE 1, except that the compositions of the mixtures of the starting materials were adjusted as described above. The composition analysis of the ceramic bodies was performed on the resulting laminated negative-characteristic thermistors of Samples 55 to 74 by inductively coupled plasma-atomic emission spectroscopy (ICP-AES). The results demonstrated that the compositions of the resulting ceramic bodies were equal to initial compositions thereof.

In each of Samples 55 to 74, the percentage of erosion by plating (%), transverse strength (N), the percentage of pore areas (%), $\Delta R_{25}/R_{25}$ were measured. Mapping analysis of Ni was performed to measure the percentage of the NiO phase. Specifically, the strength of characteristic X-rays from Ni was In each of Samples 55 to 57, in which the content of Mn is about 80 mol % or more and in which the content of Ni is about 20 mol % or less, the formation of the NiO phase is inhibited without the content of Ti. The results demonstrate that in each of Samples 58 and 59, in which the content of Ni exceeds about 20 mol %, the NiO phase is formed. In Samples 59 to 65, in which contents of Ni are about 25 mol % or more and in which molar ratios of Mn to Ti are different, the samples containing Ti is compared with the samples not containing Ti. The results demonstrate that Samples 60, 62, 64, and 65 containing 2 or 5 parts by mole of Ti can suppress the formation of the NiO phase, compared with Samples not containing Ti.

The results demonstrate that since the content of Ti reduces the percentage of erosion by plating to about ⅓ or less, transverse strength is satisfactorily about 40 N or more. Furthermore, the results demonstrate that even when sintering is performed at a low temperature of about 1,000° C., the resulting ceramic body has a low percentage of the pore areas and sufficient denseness. Also in Samples 66 to 74 which have the same molar ratio of Mn to Ti, an increase in Ti content can prevent the formation of the NiO phase. When the Ti content is within the range of preferred embodiments of the present invention, the increase in Ti content can reduce the percentage of erosion by plating while satisfactory transverse strength is maintained. Hence, high-reliability negative-characteristic thermistors are obtained.

Example 3

Comparisons among semiconductor ceramic materials according to the first preferred embodiments of the present invention, the materials containing another transition metal element, are made. $Mn_3O_4$, $NiO$, $Fe_2O_3$, $CuO$, and $TiO_2$ were prepared as starting materials. Samples 75 to 113 were produced by the same method as in EXAMPLE 1, except that the starting materials were mixed such that the resulting mixtures satisfy compositions shown in Table 3. The content of Ti shown in Table 3 is the amount of Ti added (part by mole) when the total molar quantity of Mn and Ni is defined as 100 parts by mole. The same characteristic evaluation was performed by the same method as in EXAMPLE 1. Table 3 shows the results.

TABLE 3

| Sample | Mn mol | Ni mol | Fe mol | Cu mol | Ti mol | Percentage of erosion by plating % | Transverse strength N | Percentage of pore area % | ΔR/R % | Resistivity kΩcm | B constant K | 3CV % |
|---|---|---|---|---|---|---|---|---|---|---|---|---|
| 75 | 76.2 | 19.0 | 4.8 | — | 4.0 | 1.0 | 69.8 | 0.6 | 0.65 | 10.2 | 4171 | 0.07 |
| 76 | 76.2 | 19.0 | 4.8 | — | 8.0 | 0.2 | 77.5 | <0.1 | 0.62 | 41.1 | 4449 | 0.03 |
| 77 | 71.4 | 23.8 | 4.8 | — | 4.0 | 0.9 | 63.9 | 0.5 | 0.79 | 6.7 | 4015 | 0.05 |
| 78 | 71.4 | 23.8 | 4.8 | — | 8.0 | 0.2 | 69.9 | <0.1 | 0.72 | 18.4 | 4241 | 0.02 |
| 79 | 66.7 | 28.5 | 4.8 | — | 4.0 | 0.8 | 63.1 | 0.4 | 1.24 | 5.8 | 3945 | 0.02 |
| 80 | 66.7 | 28.5 | 4.8 | — | 8.0 | 0.1 | 68.4 | <0.1 | 1.04 | 18.2 | 4149 | 0.05 |
| 81 | 61.9 | 33.3 | 4.8 | — | 4.0 | 0.6 | 59.2 | 0.4 | 0.21 | 6.6 | 3941 | 0.04 |
| 82 | 61.9 | 33.3 | 4.8 | — | 8.0 | 0.2 | 62.1 | <0.1 | 0.23 | 16.9 | 4099 | 0.03 |
| 83 | 57.1 | 38.1 | 4.8 | — | 4.0 | 0.5 | 56.3 | 0.3 | 0.16 | 8.3 | 3951 | 0.02 |
| 84 | 57.1 | 38.1 | 4.8 | — | 8.0 | 0.1 | 59.3 | <0.1 | 0.15 | 21.8 | 4128 | 0.04 |
| 85 | 72.7 | 18.2 | 9.1 | — | 4.0 | 0.9 | 70.2 | 0.5 | 0.67 | 16.6 | 4186 | 0.05 |
| 86 | 72.7 | 18.2 | 9.1 | — | 8.0 | 0.1 | 81.7 | <0.1 | 0.66 | 85.5 | 4555 | 0.05 |
| 87 | 72.7 | 18.2 | 9.1 | — | 12.0 | <0.1 | 81.2 | <0.1 | 0.33 | 371.8 | 4913 | 0.06 |
| 88 | 72.7 | 18.2 | 9.1 | — | 16.0 | <0.1 | 83.2 | <0.1 | 0.34 | 2482.5 | 5465 | 0.07 |
| 89 | 68.2 | 22.7 | 9.1 | — | 4.0 | 0.7 | 70.1 | 0.4 | 0.81 | 8.7 | 3985 | 0.07 |
| 90 | 68.2 | 22.7 | 9.1 | — | 8.0 | 0.1 | 75.9 | <0.1 | 0.75 | 30.4 | 4247 | 0.09 |
| 91 | 68.2 | 22.7 | 9.1 | — | 12.0 | <0.1 | 77.4 | <0.1 | 0.08 | 98.6 | 4522 | 0.08 |
| 92 | 68.2 | 22.7 | 9.1 | — | 16.0 | <0.1 | 79.2 | <0.1 | 0.22 | 487.5 | 4886 | 0.07 |
| 93 | 63.6 | 27.3 | 9.1 | — | 4.0 | 0.6 | 66.8 | 0.3 | 1.33 | 7.1 | 3884 | 0.04 |
| 94 | 63.6 | 27.3 | 9.1 | — | 8.0 | 0.1 | 72.9 | <0.1 | 1.08 | 20.2 | 4104 | 0.04 |
| 95 | 63.6 | 27.3 | 9.1 | — | 12.0 | <0.1 | 74.6 | <0.1 | 0.01 | 51.8 | 4313 | 0.04 |
| 96 | 63.6 | 27.3 | 9.1 | — | 16.0 | <0.1 | 77.6 | <0.1 | 0.20 | 190.6 | 4586 | 0.05 |
| 97 | 59.1 | 31.8 | 9.1 | — | 4.0 | 0.6 | 66.2 | 0.3 | 0.41 | 6.5 | 3825 | 0.04 |
| 98 | 59.1 | 31.8 | 9.1 | — | 8.0 | 0.1 | 69.3 | <0.1 | 0.33 | 26.1 | 4027 | 0.03 |
| 99 | 59.1 | 31.8 | 9.1 | — | 12.0 | <0.1 | 71.2 | <0.1 | 0.48 | 57.5 | 4122 | 0.05 |
| 100 | 59.1 | 31.8 | 9.1 | — | 16.0 | <0.1 | 73.5 | <0.1 | 0.55 | 127.2 | 4427 | 0.04 |
| 101 | 54.5 | 36.4 | 9.1 | — | 4.0 | 0.4 | 61.2 | 0.3 | 0.25 | 7.4 | 3804 | 0.05 |
| 102 | 54.5 | 36.4 | 9.1 | — | 8.0 | <0.1 | 62.3 | <0.1 | 0.36 | 15.2 | 4020 | 0.06 |
| 103 | 54.5 | 36.4 | 9.1 | — | 12.0 | <0.1 | 69.8 | <0.1 | 0.55 | 60.3 | 4135 | 0.05 |
| 104 | 54.5 | 36.4 | 9.1 | — | 16.0 | <0.1 | 73.5 | <0.1 | 0.72 | 110.3 | 4347 | 0.06 |
| 105 | 76.2 | 20.9 | — | 2.9 | 5.0 | 1.1 | 59.8 | 0.2 | 0.43 | 0.77 | 3728 | 0.16 |
| 106 | 74.8 | 20.4 | — | 4.8 | 5.0 | 1.0 | 61.2 | 0.2 | 0.53 | 0.22 | 3456 | 0.15 |
| 107 | 73.4 | 20.1 | — | 6.5 | 5.0 | 1.1 | 57.8 | <0.1 | 0.66 | 0.07 | 3175 | 0.23 |
| 108 | 76.2 | 20.9 | — | 2.9 | 6.0 | 0.8 | 62.2 | 0.2 | 0.39 | 0.9 | 3746 | 0.19 |
| 109 | 74.8 | 20.4 | — | 4.8 | 6.0 | 0.8 | 62.3 | <0.1 | 0.55 | 0.25 | 3458 | 0.15 |
| 110 | 73.4 | 20.1 | — | 6.5 | 6.0 | 0.7 | 64.3 | <0.1 | 0.61 | 0.1 | 3253 | 0.15 |
| 111 | 76.2 | 20.9 | — | 2.9 | 7.0 | 0.4 | 65.3 | <0.1 | 0.29 | 1.07 | 3763 | 0.24 |
| 112 | 74.8 | 20.4 | — | 4.8 | 7.0 | 0.4 | 66.2 | <0.1 | 0.34 | 0.29 | 3453 | 0.16 |
| 113 | 73.4 | 20.1 | — | 6.5 | 7.0 | 0.4 | 61.3 | <0.1 | 0.38 | 0.1 | 3239 | 0.20 |
| 283 | 66.7 | 16.7 | 16.7 | — | 4.0 | 0.7 | 70.7 | 0.4 | 0.62 | 101.5 | 4701 | 0.05 |
| 284 | 66.7 | 16.7 | 16.7 | — | 8.0 | <0.1 | 82.2 | <0.1 | 0.61 | 562.4 | 5100 | 0.05 |
| 285 | 66.7 | 16.7 | 16.7 | — | 12.0 | <0.1 | 82.3 | <0.1 | 0.33 | 2432.5 | 5492 | 0.06 |
| 286 | 66.7 | 16.7 | 16.7 | — | 16.0 | <0.1 | 83.4 | <0.1 | 0.31 | 10844.5 | 5850 | 0.07 |
| 287 | 62.5 | 20.8 | 16.7 | — | 4.0 | 0.5 | 71.2 | 0.3 | 0.8 | 25.6 | 4005 | 0.07 |
| 288 | 62.5 | 20.8 | 16.7 | — | 8.0 | <0.1 | 76.2 | <0.1 | 0.71 | 123.5 | 4401 | 0.09 |
| 289 | 62.5 | 20.8 | 16.7 | — | 12.0 | <0.1 | 77.9 | <0.1 | 0.08 | 546.9 | 4816 | 0.08 |
| 290 | 62.5 | 20.8 | 16.7 | — | 16.0 | <0.1 | 80.1 | <0.1 | 0.21 | 3967.4 | 5404 | 0.07 |
| 291 | 58.3 | 25.0 | 16.7 | — | 4.0 | 0.5 | 68.3 | 0.3 | 1.21 | 7.2 | 3856 | 0.04 |
| 292 | 58.3 | 25.0 | 16.7 | — | 8.0 | <0.1 | 73.6 | <0.1 | 1.05 | 33.6 | 4052 | 0.04 |
| 293 | 58.3 | 25.0 | 16.7 | — | 12.0 | <0.1 | 80.2 | <0.1 | 0.01 | 131.3 | 4373 | 0.04 |
| 294 | 58.3 | 25.0 | 16.7 | — | 16.0 | <0.1 | 82 | <0.1 | 0.18 | 855.2 | 4846 | 0.05 |
| 295 | 54.2 | 29.2 | 16.7 | — | 4.0 | 0.4 | 67.1 | 0.2 | 0.41 | 3.9 | 3652 | 0.04 |
| 296 | 54.2 | 29.2 | 16.7 | — | 8.0 | <0.1 | 70 | <0.1 | 0.31 | 11.2 | 3830 | 0.03 |
| 297 | 54.2 | 29.2 | 16.7 | — | 12.0 | <0.1 | 73.3 | <0.1 | 0.42 | 42.3 | 3960 | 0.05 |
| 298 | 54.2 | 29.2 | 16.7 | — | 16.0 | <0.1 | 75.8 | <0.1 | 0.49 | 236.1 | 4418 | 0.04 |

In each of Samples 75 to 113, in which when the molar quantity of Mn is represented by a and when the molar quantity of Ni is represented by b, the molar ratio of Mn to Ni is in the range of 55/45≦a/b≦90/10, and in which the content of Ti is in the range of about 0.5 parts by mole to about 25 parts by mole when the total molar quantity of Mn and Ni is defined as 100 parts by mole, the results demonstrate that despite about 1.5% or less of $\Delta R_{25}/R_{25}$, the percentage of erosion by plating is about 2.0% or less and transverse strength is about 50 N or more. Hence, the resulting laminated negative-characteristic thermistor has a low percentage of erosion by plating and excellent transverse strength. The percentage of the pore areas is as low as about 1.0% or less. The results demonstrate that even at a low sintering temperature, each sample is sufficiently sintered and has sufficient B constant and resistivity.

In each of Samples 75 to 104 and 283 to 298, the content of Fe is in the range of about 5 parts by mole to about 20 parts by mole when the total molar quantity of Mn and Ni is defined as 100 parts by mole, thus reducing non-uniformity in characteristic value (B constant 3CV).

In each of Samples 105 to 113, the content of Cu is in the range of about 3 parts by mole to about 7 parts by mole when the total molar quantity of Mn and Ni is defined as 100 parts by mole. Hence, the dense ceramic body having a low percentage of the pore areas is obtained even when the ceramic body is formed by low-temperature sintering.

In Table 3, the content of Fe is represented as the proportion of Fe when the sum of Mn, Ni, and Fe is defined as 100 mol %. The proportion is converted into the amount of Fe added (part by mole) when the total amount of Mn and Ni is defined as 100 parts by mole.

Example 4

In surface-mount negative-characteristic thermistors each including a ceramic body composed of a semiconductor ceramic material containing Mn, Co, and Ti, comparisons among the thermistors having different proportions of Mn, Co, and Ti in the semiconductor ceramic materials were made.

$Mn_3O_4$, $Co_3O_4$, and $TiO_2$ were prepared. Samples 114 to 140 were produced by the same method as in EXAMPLE 1, except that the materials were mixed in such a manner that the resulting mixtures satisfy compositions of Samples 114 to 140 shown in Table 4. The content of Ti shown in Table 4 is the amount of Ti added (part by mole) when the total molar quantity of Mn and Co is defined as 100 parts by mole. The characteristic evaluation was performed on the resulting laminated negative-characteristic thermistors of Samples 114 to 140 by the same method as in EXAMPLE 1. Table 4 shows the results.

As is apparent from Table 4, in each of Samples 115 to 121, 124 to 130, and 133 to 139, in which when the molar quantity of Mn is represented by a and when the molar quantity of Co is represented by b, the molar ratio of Mn to Co is in the range of $10/90 \leq a/b \leq 70/30$, and in which the content of Ti is in the range of about 1.0 part by mole to about 30 parts by mole when the total molar quantity of Mn and Co is defined as 100 parts by mole, the results demonstrate that despite about 1.0% or less of $\Delta R_{25}/R_{25}$, the percentage of erosion by plating is about 5.0% or less and transverse strength is about 35 N or more. Hence, the resulting laminated negative-characteristic thermistor has a low percentage of erosion by plating and excellent transverse strength. The percentage of the pore areas is as low as about 3.0% or less. The results demonstrate that even at a low sintering temperature, each sample is sufficiently sintered and has sufficient B constant and resistivity. In each of Samples 117, 118, 125 to 130, and 134 to 139, in which the molar ratio of Mn to Co is in the range of $30/70 \leq a/b \leq 40/60$, and in which the content of Ti is in the range of about 3 parts by mole to about 30 parts by mole when the total molar quantity of Mn and Co is defined as 100 parts by mole, the percentage of erosion by plating is about 4.0% or less, and $\Delta R_{25}/R_{25}$, which indicates reliability, is about 0.5% or less. Hence, the more excellent laminated negative-characteristic thermistor is obtained.

On the other hand, in Sample 122 having a molar ratio of Mn to Co exceeding about 70/30, the ceramic body is insulated. Hence, the sample is not preferred because it cannot be used as a negative-characteristic thermistor. Also in Sample 114 having a molar ratio of Mn to Co less than about 10/90, the ceramic body is insulated. Hence, the sample is not preferred because it cannot be used as a negative-characteristic

TABLE 4

| Sample | Mn mol | Co mol | Ti part by mol | Percentage of erosion by plating % | Transverse strength N | Percentage of pore area % | ΔR/R % | Resistivity kΩcm | B constant K | 3CV % |
|---|---|---|---|---|---|---|---|---|---|---|
| *114 | 5.0 | 95.0 | 5.0 | 5.2 | 39.4 | 0.4 | — | — | — | — |
| 115 | 10.0 | 90.0 | 5.0 | 4.8 | 42.3 | 0.8 | 0.92 | 16.51 | 4292 | 0.31 |
| 116 | 20.0 | 80.0 | 5.0 | 4.2 | 44.1 | 0.9 | 0.82 | 5.23 | 3870 | 0.29 |
| 117 | 30.0 | 70.0 | 5.0 | 3.4 | 46.4 | 1.1 | 0.21 | 0.65 | 3963 | 0.27 |
| 118 | 40.0 | 60.0 | 5.0 | 2.7 | 47.8 | 1.3 | 0.15 | 0.57 | 3989 | 0.11 |
| 119 | 50.0 | 50.0 | 5.0 | 2.1 | 50.1 | 1.6 | 0.62 | 0.92 | 4056 | 0.13 |
| 120 | 60.0 | 70.0 | 5.0 | 1.7 | 52.3 | 1.8 | 0.89 | 23.85 | 4323 | 0.24 |
| 121 | 70.0 | 30.0 | 5.0 | 1.6 | 52.4 | 1.9 | 0.79 | 523.1 | 5217 | 0.33 |
| *122 | 80.0 | 20.0 | 5.0 | 1.6 | 53.1 | 1.9 | — | — | — | — |
| *123 | 30.0 | 70.0 | 0.0 | 11.2 | 7.4 | 2.8 | 0.91 | 0.37 | 4096 | 0.55 |
| 124 | 30.0 | 70.0 | 1.0 | 4.8 | 38.2 | 1.9 | 0.62 | 0.44 | 4072 | 0.41 |
| 125 | 30.0 | 70.0 | 3.0 | 3.8 | 41.2 | 1.4 | 0.22 | 0.51 | 4033 | 0.35 |
| 126 | 30.0 | 70.0 | 5.0 | 3.4 | 46.4 | 1.1 | 0.21 | 0.65 | 3963 | 0.27 |
| 127 | 30.0 | 70.0 | 10.0 | 0.4 | 58.1 | 0.9 | 0.15 | 1.41 | 3980 | 0.22 |
| 128 | 30.0 | 70.0 | 20.0 | <0.1 | 66.4 | 0.7 | 0.15 | 6.99 | 4134 | 0.19 |
| 129 | 30.0 | 70.0 | 25.0 | <0.1 | 70.4 | 0.6 | 0.21 | 10.21 | 4355 | 0.18 |
| 130 | 30.0 | 70.0 | 30.0 | <0.1 | 74.4 | 0.3 | 0.46 | 159.81 | 4635 | 0.15 |
| *131 | 30.0 | 70.0 | 35.0 | <0.1 | 80.1 | 0.1 | — | — | — | — |
| *132 | 40.0 | 60.0 | 0.0 | 9.8 | 9.1 | 3.1 | 1.41 | 0.26 | 4108 | 0.42 |
| 133 | 40.0 | 60.0 | 1.0 | 4.4 | 39.6 | 2.6 | 0.88 | 0.31 | 4088 | 0.34 |
| 134 | 40.0 | 60.0 | 3.0 | 3.4 | 42.8 | 2.1 | 0.21 | 0.39 | 4043 | 0.22 |
| 135 | 40.0 | 60.0 | 5.0 | 2.7 | 47.8 | 1.3 | 0.15 | 0.57 | 3989 | 0.11 |
| 136 | 40.0 | 60.0 | 10.0 | 0.2 | 63.8 | 1.4 | 0.11 | 1.36 | 4013 | 0.12 |
| 137 | 40.0 | 60.0 | 20.0 | <0.1 | 66.7 | 1.1 | 0.16 | 12.05 | 4284 | 0.09 |
| 138 | 40.0 | 60.0 | 25.0 | <0.1 | 69.4 | 0.9 | 0.14 | 39.45 | 4432 | 0.10 |
| 139 | 40.0 | 60.0 | 30.0 | <0.1 | 73.4 | 0.4 | 0.56 | 221.31 | 4705 | 0.11 |
| *140 | 40.0 | 60.0 | 35.0 | <0.1 | 79.2 | 0.2 | — | — | — | — |

*indicates the sample out of the range of the present invention thermistor. In each of Samples 123 and 132, in which Ti is less than about 1.0 part by mole when the total molar quantity of Mn and Co is defined as 100 parts by mole, the results demonstrate significant erosion by the plating solution and low transverse strength because of the insufficient Ti content. In each of Samples 131 and 140 each having a Ti content exceeding about 30 parts by mole when the total molar quantity of Mn and Co is defined as 100 parts by mole, the results demonstrate that the resistivity of the ceramic body exceeds a meaningful value as a commercial product.

Example 5

Comparisons among semiconductor ceramic materials according to the fourth preferred embodiment of the present invention, the materials containing another transition metal element, are made. $Mn_3O_4$, $Co_3O_4$, $Fe_2O_3$, CuO, and $TiO_2$ were prepared as starting materials. Samples 141 to 197 were produced by the same method as in EXAMPLE 1, except that the starting materials were mixed such that the resulting mixtures satisfy compositions shown in Tables 5 and 6. The content of Ti shown in each of Tables 5 and 6 is the amount of Ti added (part by mole) when the total amount of Mn and Co in the semiconductor ceramic material is defined as 100 parts by mole. The same characteristic evaluation was performed by the same method as in EXAMPLE 1. Tables 5 and 6 show the results.

TABLE 5

| Sample | Mn mol | Co mol | Fe mol | Cu mol | Ti part by mol | Percentage of erosion by plating % | Transverse strength N | Percentage of pore area % | ΔR/R % | Resistivity kΩcm | B constant K | 3CV % |
|---|---|---|---|---|---|---|---|---|---|---|---|---|
| 141 | 36.7 | 46.7 | 16.6 | — | 4 | 1.9 | 42.2 | 0.8 | 0.38 | 1.2 | 3697 | 0.04 |
| 142 | 36.7 | 46.7 | 16.6 | — | 8 | 0.4 | 57.8 | 0.2 | 0.21 | 2.8 | 3883 | 0.05 |
| 143 | 36.7 | 46.7 | 16.6 | — | 12 | <0.1 | 65.4 | <0.1 | 0.29 | 8.1 | 4075 | 0.07 |
| 144 | 36.7 | 43.3 | 20.0 | — | 4 | 1.8 | 43.4 | 0.8 | 0.32 | 1.2 | 3552 | 0.09 |
| 145 | 36.7 | 43.3 | 20.0 | — | 8 | 0.4 | 59.2 | 0.2 | 0.25 | 4.8 | 3827 | 0.16 |
| 146 | 36.7 | 43.3 | 20.0 | — | 12 | <0.1 | 68.3 | <0.1 | 0.21 | 17.8 | 4133 | 0.1 |
| 147 | 36.7 | 40.0 | 23.3 | — | 4 | 1.7 | 43.4 | 0.9 | 0.28 | 2.8 | 3645 | 0.13 |
| 148 | 36.7 | 40.0 | 23.3 | — | 8 | 0.3 | 59.8 | 0.3 | 0.26 | 10.1 | 3901 | 0.08 |
| 149 | 36.7 | 40.0 | 23.3 | — | 12 | <0.1 | 59.4 | <0.1 | 0.22 | 51.2 | 4231 | 0.13 |
| 150 | 36.7 | 56.7 | 6.6 | — | 3.6 | 1.9 | 41.4 | 0.3 | 0.01 | 0.7 | 3882 | 0.09 |
| 151 | 36.7 | 56.7 | 6.6 | — | 7.1 | 0.3 | 56.5 | <0.1 | 0.04 | 1.33 | 3936 | 0.09 |
| 152 | 36.7 | 56.7 | 6.6 | — | 10.7 | <0.1 | 62.3 | <0.1 | 0.05 | 2.79 | 4013 | 0.08 |
| 153 | 36.7 | 53.3 | 10.0 | — | 3.7 | 1.7 | 42.0 | 0.4 | 0.29 | 0.85 | 3842 | 0.02 |
| 154 | 36.7 | 53.3 | 10.0 | — | 7.4 | <0.1 | 57.1 | 0.1 | 0.21 | 1.79 | 3932 | 0.04 |
| 155 | 36.7 | 53.3 | 10.0 | — | 11.1 | <0.1 | 61.2 | <0.1 | 0.22 | 4.12 | 4041 | 0.11 |
| 156 | 36.7 | 50.0 | 13.3 | — | 3.8 | 0.9 | 49.3 | 0.4 | 0.40 | 1.21 | 3800 | 0.17 |
| 157 | 36.7 | 50.0 | 13.3 | — | 7.7 | <0.1 | 59.9 | 0.1 | 0.33 | 2.78 | 3928 | 0.31 |
| 158 | 36.7 | 50.0 | 13.3 | — | 11.5 | <0.1 | 69.9 | <0.1 | 0.30 | 6.87 | 4071 | 0.10 |
| 159 | 34.4 | 50.0 | 15.7 | — | 4.0 | 2.1 | 39.9 | 0.6 | 0.00 | 1.38 | 3707 | 0.12 |
| 160 | 34.4 | 46.9 | 18.7 | — | 4.2 | 1.9 | 42.4 | 0.5 | 0.04 | 2.22 | 3593 | 0.18 |
| 161 | 34.4 | 43.8 | 21.8 | — | 4.3 | 1.8 | 43.3 | 0.3 | 0.01 | 2.88 | 3614 | 0.19 |
| 162 | 33.3 | 50.0 | 16.7 | — | 4.0 | 2.1 | 38.8 | 0.5 | 0.07 | 1.35 | 3700 | 0.06 |
| 163 | 33.3 | 46.7 | 20.0 | — | 4.2 | 1.8 | 42.9 | 0.3 | 0.09 | 1.20 | 3429 | 0.14 |
| 164 | 33.3 | 43.3 | 23.4 | — | 4.3 | 1.7 | 44.4 | 0.3 | 0.09 | 3.42 | 3660 | 0.15 |
| 165 | 40.0 | 43.3 | 16.7 | — | 4.0 | 1.9 | 44.9 | 0.6 | 0.81 | 2.31 | 3793 | 0.25 |
| 166 | 40.0 | 40.0 | 20.0 | — | 4.2 | 1.9 | 46.1 | 0.6 | 0.78 | 3.68 | 3699 | 0.14 |
| 167 | 40.0 | 36.7 | 23.3 | — | 4.3 | 1.7 | 47.8 | 0.7 | 0.97 | 7.01 | 3811 | 0.05 |
| 168 | 43.3 | 40.0 | 16.7 | — | 4 | 1.6 | 48.2 | 0.6 | 0.40 | 2.76 | 3847 | 0.04 |
| 169 | 43.3 | 36.7 | 20.0 | — | 4.2 | 1.5 | 48.3 | 0.7 | 0.51 | 5.63 | 3777 | 0.30 |
| 170 | 43.3 | 33.3 | 23.4 | — | 4.3 | 1.4 | 49.0 | 0.7 | 1.11 | 15.82 | 3952 | 0.10 |
| 171 | 36.7 | 56.7 | 6.6 | — | 14.3 | <0.1 | 69.3 | <0.1 | 0.07 | 6.03 | 4130 | 0.07 |
| 172 | 36.7 | 56.7 | 6.6 | — | 17.9 | <0.1 | 71.2 | <0.1 | 0.04 | 14.80 | 4263 | 0.04 |
| 173 | 36.7 | 56.7 | 6.6 | — | 21.4 | <0.1 | 72.1 | <0.1 | 0.03 | 40.77 | 4429 | 0.04 |
| 174 | 36.7 | 56.7 | 6.6 | — | 25 | <0.1 | 72.3 | <0.1 | 0.05 | 140.4 | 4642 | 0.05 |
| 175 | 36.7 | 56.7 | 6.6 | — | 28.6 | <0.1 | 78.6 | <0.1 | 0.07 | 576.4 | 4928 | 0.15 |
| 176 | 36.7 | 53.3 | 10.0 | — | 14.8 | <0.1 | 70.3 | <0.1 | 0.33 | 10.17 | 4183 | 0.04 |
| 177 | 36.7 | 53.3 | 10.0 | — | 18.5 | <0.1 | 73.6 | <0.1 | 0.40 | 30.38 | 4352 | 0.03 |
| 178 | 36.7 | 53.3 | 10.0 | — | 22.2 | <0.1 | 75.5 | <0.1 | 0.23 | 102.1 | 4564 | 0.08 |
| 179 | 36.7 | 53.3 | 10.0 | — | 25.9 | <0.1 | 75.1 | <0.1 | 0.29 | 482.2 | 4866 | 0.17 |
| 180 | 36.7 | 53.3 | 10.0 | — | 29.6 | <0.1 | 75.9 | <0.1 | 0.25 | 1880.0 | 5187 | 0.27 |

TABLE 6

| Sample | Mn mol | Co mol | Fe mol | Cu mol | Ti part by mol | Percentage of erosion by plating % | Transverse strength N | Percentage of pore area % | ΔR/R % | Resistivity kΩcm | B constant K | 3CV % |
|---|---|---|---|---|---|---|---|---|---|---|---|---|
| 181 | 29.4 | 68.6 | — | 2.0 | 5.0 | 3.2 | 43.4 | 0.2 | 0.33 | 0.43 | 3710 | 0.06 |
| 182 | 39.2 | 58.8 | — | 2.0 | 5.0 | 2.9 | 45.2 | 0.2 | 0.29 | 0.34 | 3702 | 0.05 |
| 183 | 49.0 | 49.0 | — | 2.0 | 5.0 | 2.3 | 49.7 | <0.1 | 0.35 | 0.48 | 3602 | 0.13 |
| 184 | 28.8 | 67.3 | — | 3.8 | 5.0 | 3.4 | 40.1 | 0.2 | 0.53 | 0.24 | 3473 | 0.09 |
| 185 | 38.5 | 57.7 | — | 3.8 | 5.0 | 3.2 | 42.2 | <0.1 | 0.45 | 0.21 | 3492 | 0.05 |
| 186 | 48.1 | 48.1 | — | 3.8 | 5.0 | 2.7 | 44.0 | <0.1 | 0.59 | 0.27 | 3381 | 0.05 |

TABLE 6-continued

| Sample | Mn mol | Co mol | Fe mol | Cu mol | Ti part by mol | Percentage of erosion by plating % | Transverse strength N | Percentage of pore area % | ΔR/R % | Resistivity kΩcm | B constant K | 3CV % |
|---|---|---|---|---|---|---|---|---|---|---|---|---|
| 187 | 28.3 | 66.0 | — | 5.7 | 5.0 | 3.8 | 37.8 | <0.1 | 0.66 | 0.14 | 3313 | 0.14 |
| 188 | 37.7 | 56.6 | — | 5.7 | 5.0 | 3.5 | 40.1 | <0.1 | 0.52 | 0.14 | 3335 | 0.06 |
| 189 | 47.2 | 47.2 | — | 5.7 | 5.0 | 2.9 | 42.2 | <0.1 | 0.71 | 0.23 | 3286 | 0.1 |
| 190 | 36.1 | 55.7 | 6.6 | 1.6 | 8.9 | 0.4 | 59.9 | <0.1 | 0.22 | 1.03 | 3817 | 0.06 |
| 191 | 35.6 | 54.8 | 6.5 | 3.1 | 8.9 | 0.4 | 60.1 | <0.1 | 0.4 | 0.73 | 3700 | 0.03 |
| 192 | 34.9 | 54 | 6.4 | 4.7 | 8.9 | 0.4 | 57.9 | <0.1 | 0.48 | 0.48 | 3608 | 0.07 |
| 193 | 34.4 | 53.1 | 6.3 | 6.2 | 8.9 | 0.4 | 59.3 | <0.1 | 0.53 | 0.33 | 3532 | 0.07 |
| 194 | 36.1 | 55.7 | 6.6 | 1.6 | 17.9 | <0.1 | 73.4 | <0.1 | 0.4 | 7.72 | 4070 | 0.05 |
| 195 | 35.5 | 54.8 | 6.5 | 3.2 | 17.9 | <0.1 | 73.4 | <0.1 | 0.74 | 4.45 | 3932 | 0.06 |
| 196 | 34.9 | 54 | 6.4 | 4.7 | 17.9 | <0.1 | 79.1 | <0.1 | 0.96 | 2.89 | 3811 | 0.03 |
| 197 | 34.4 | 53.1 | 6.3 | 6.2 | 17.9 | <0.1 | 77.4 | <0.1 | 1.11 | 1.77 | 3703 | 0.08 |

In each of Samples 141 to 197, in which when the molar quantity of Mn is represented by a and when the molar quantity of Co is represented by c, the molar ratio of Mn to Co is in the range of $10/90 \leqq a/c \leqq 70/30$, and in which the content of Ti is in the range of about 1 part by mole to about 30 parts by mole when the total molar quantity of Mn and Co is defined as 100 parts by mole, the results demonstrate that despite about 1.5% or less of $\Delta R_{25}/R_{25}$, the percentage of erosion by plating is about 4.0% or less and transverse strength is about 35 N or more. Hence, the resulting laminated negative-characteristic thermistor has a low percentage of erosion by plating and excellent transverse strength. The percentage of the pore areas is as low as about 2.0% or less. The results demonstrate that even at a low sintering temperature, each sample is sufficiently sintered and has sufficient B constant and resistivity.

In each of Samples 141 to 180 and 190 to 197, the content of Fe is in the range of about 7 parts by mole to about 31 parts by mole when the total molar quantity of Mn and Co is defined as 100 parts by mole, thus reducing variations in characteristic value (B constant 3CV).

In each of Samples 181 to 197, the content of Cu is in the range of about 2 parts by mole to about 7 parts by mole when the total molar quantity of Mn and Co is defined as 100 parts by mole. Hence, the dense ceramic body having a low percentage of the pore areas is obtained even when the ceramic body is formed by low-temperature sintering.

In Tables 5 and 6, the sum of Mn, Co, and Fe is defined as 100 mol %, the sum of Mn, Co, and Cu is defined as 100 mol %, or the sum of Mn, Co, Fe, and Cu is defined as 100 mol %. As described above, contents of Fe and Cu are represented in terms of part by mole when the sum of Mn and Co is defined as 100 parts by mole.

Example 6

In semiconductor ceramic materials according to the sixth preferred embodiment of the present invention, the materials each containing Mn, Ni, and Co as main constituents and containing Ti, comparisons among the materials having different compositions are made. Furthermore, comparisons among the semiconductor ceramic materials containing another transition metal element are made.

$Mn_3O_4$, $NiO$, $Co_3O_4$, $Fe_2O_3$, $CuO$, and $TiO_2$ were prepared as starting materials. Samples 198 to 272 were produced by the same method as in EXAMPLE 1, except that the starting materials were mixed such that the resulting mixtures satisfy compositions shown in Tables 7 and 8. The content of Ti shown in each of Tables 7 and 8 is the amount of Ti added (part by mole) when the total amount of Mn, Ni, and Co in the semiconductor ceramic material is defined as 100 parts by mole. The same characteristic evaluation was performed by the same method as in EXAMPLE 1. Tables 7 and 8 show the results.

TABLE 7

| Sample | Mn mol | Ni mol | Co mol | Fe mol | Cu mol | Ti mol | Percentage of erosion by plating % | Transverse strength N | Percentage of pore area % | ΔR/R % | Resistivity kΩcm | B constant K | 3CV % |
|---|---|---|---|---|---|---|---|---|---|---|---|---|---|
| 198 | 55.2 | 10.8 | 34.0 | — | — | 1.1 | 2.7 | 41.4 | 1.7 | 1.15 | 0.36 | 3539 | 0.06 |
| 199 | 53.1 | 14.1 | 32.8 | — | — | 1.2 | 2.6 | 42.3 | 1.7 | 0.61 | 0.29 | 3490 | 0.22 |
| 200 | 51.3 | 17.1 | 31.6 | — | — | 1.2 | 2.5 | 42.9 | 1.7 | 0.71 | 0.26 | 3397 | 0.08 |
| 201 | 30.8 | 21.3 | 48.0 | — | — | 3.0 | 2.9 | 40.0 | 0.3 | 0.05 | 0.68 | 3585 | 0.16 |
| 202 | 29.2 | 21.3 | 49.5 | — | — | 3.0 | 3.1 | 39.6 | 0.1 | 0.22 | 0.77 | 3592 | 0.15 |
| 203 | 27.7 | 21.3 | 51.1 | — | — | 3.0 | 3.2 | 38.2 | 0.1 | 0.13 | 0.85 | 3588 | 0.15 |
| 204 | 26.1 | 21.3 | 52.7 | — | — | 3.0 | 2.2 | 37.7 | 0.1 | 0.01 | 0.97 | 3589 | 0.16 |
| 205 | 64.0 | 21.2 | 14.8 | — | — | 3.5 | 0.8 | 35.5 | 0.4 | 0.56 | 0.95 | 3645 | 0.15 |
| 206 | 59.0 | 27.4 | 13.6 | — | — | 3.5 | 0.6 | 37.5 | 0.5 | 0.13 | 0.87 | 3586 | 0.21 |
| 207 | 31.3 | 20.7 | 48.0 | — | — | 3.5 | 2.9 | 40.2 | <0.1 | 0.05 | 0.57 | 3526 | 0.16 |
| 208 | 30.8 | 21.3 | 48.0 | — | — | 4.0 | 2.4 | 42.3 | 0.1 | 0.06 | 0.81 | 3606 | 0.13 |
| 209 | 29.2 | 21.3 | 49.5 | — | — | 4.0 | 2.5 | 41.3 | <0.1 | 0.18 | 0.93 | 3616 | 0.14 |
| 210 | 27.7 | 21.3 | 51.1 | — | — | 4.0 | 2.7 | 39.5 | <0.1 | 0.22 | 0.97 | 3614 | 0.14 |
| 211 | 26.1 | 21.3 | 52.7 | — | — | 4.0 | 2.9 | 38.8 | <0.1 | 0.19 | 1.01 | 3611 | 0.14 |
| 212 | 55.2 | 10.8 | 34.0 | — | — | 4.7 | 1.4 | 42.7 | <0.1 | 0.42 | 0.71 | 3704 | 0.24 |
| 213 | 53.1 | 14.1 | 32.8 | — | — | 4.7 | 1.3 | 58.8 | 1.8 | 1.03 | 0.66 | 3647 | 0.15 |
| 214 | 51.2 | 17.2 | 31.6 | — | — | 4.7 | 1.6 | 47.3 | 0.1 | 0.62 | 0.45 | 3551 | 0.16 |
| 215 | 44.8 | 21.3 | 33.9 | — | — | 5.9 | 0.9 | 40.3 | 0.2 | 0.03 | 0.50 | 3472 | 0.18 |
| 216 | 47.8 | 22.7 | 29.5 | — | — | 5.9 | 0.8 | 44.1 | 0.2 | 0.36 | 0.50 | 3380 | 0.23 |
| 217 | 51.1 | 21.3 | 27.6 | — | — | 5.9 | 0.8 | 52.1 | 0.3 | 0.04 | 0.63 | 3519 | 0.23 |
| 218 | 45.7 | 6.7 | 47.6 | — | — | 6.2 | 1.8 | 44.5 | 0.2 | 1.06 | 0.87 | 3870 | 0.12 |

TABLE 7-continued

| Sample | Mn mol | Ni mol | Co mol | Fe mol | Cu mol | Ti mol | Percentage of erosion by plating % | Transverse strength N | Percentage of pore area % | ΔR/R % | Resistivity kΩcm | B constant K | 3CV % |
|---|---|---|---|---|---|---|---|---|---|---|---|---|---|
| 219 | 44.1 | 10.0 | 45.9 | — | — | 6.2 | 1.7 | 48.5 | 0.1 | 0.88 | 0.66 | 3753 | 0.15 |
| 220 | 42.6 | 13.1 | 44.3 | — | — | 6.2 | 1.5 | 48.9 | 0.1 | 0.52 | 0.57 | 3649 | 0.16 |
| 221 | 41.2 | 16.0 | 42.8 | — | — | 6.2 | 1.4 | 49.9 | 0.1 | 0.21 | 0.54 | 3604 | 0.18 |
| 222 | 42.2 | 20.0 | 37.8 | — | — | 7.0 | 1.4 | 55.3 | <0.1 | 0.06 | 0.54 | 3491 | 0.21 |
| 223 | 59.1 | 28.0 | 12.9 | — | — | 7.0 | 0.3 | 48.9 | <0.1 | 0.32 | 2.01 | 3705 | 0.21 |
| 224 | 38.6 | 21.2 | 40.2 | — | — | 7.0 | 1.1 | 45.6 | <0.1 | 0.25 | 0.61 | 3495 | 0.17 |
| 225 | 55.2 | 10.8 | 34.0 | — | — | 7.8 | 0.1 | 63.4 | 0.9 | 0.72 | 1.39 | 3859 | 0.18 |
| 226 | 53.1 | 14.1 | 32.8 | — | — | 8.1 | 0.1 | 66.4 | 0.9 | 0.97 | 1.12 | 3789 | 0.08 |
| 227 | 51.3 | 17.1 | 31.6 | — | — | 8.4 | 0.1 | 64.3 | 0.9 | 1.4 | 0.98 | 3695 | 0.08 |
| 228 | 55.2 | 10.8 | 34.0 | — | — | 11.2 | <0.1 | 69.1 | 0.5 | 1.30 | 2.68 | 4005 | 0.09 |
| 229 | 53.1 | 14.1 | 32.8 | — | — | 11.6 | <0.1 | 67.8 | 0.4 | 0.89 | 2.42 | 3925 | 0.03 |
| 230 | 51.3 | 17.1 | 31.6 | — | — | 12.1 | <0.1 | 78.4 | 0.3 | 1.33 | 1.86 | 3840 | 0.12 |
| 231 | 59.1 | 28.0 | 12.9 | — | — | 14.1 | <0.1 | 69.2 | <0.1 | 0.29 | 5.87 | 3993 | 0.19 |
| 232 | 55.2 | 10.8 | 34.0 | — | — | 14.6 | <0.1 | 77.7 | 0.1 | 1.31 | 5.90 | 4152 | 0.04 |
| 233 | 53.1 | 14.1 | 32.8 | — | — | 15.1 | <0.1 | 79.4 | 0.1 | 0.83 | 4.59 | 4062 | 0.14 |
| 234 | 51.3 | 17.1 | 31.6 | — | — | 15.7 | <0.1 | 82.4 | <0.1 | 1.38 | 3.66 | 3978 | 0.09 |

TABLE 8

| Sample | Mn mol | Ni mol | Co mol | Fe mol | Cu mol | Ti mol | Percentage of erosion by plating % | Transverse strength N | Percentage of pore area % | ΔR/R % | Resistivity kΩcm | B constant K | 3CV % |
|---|---|---|---|---|---|---|---|---|---|---|---|---|---|
| 235 | 44.0 | 8.9 | 26.1 | 21.0 | — | 9.5 | 0.1 | 80.1 | <0.1 | 0.11 | 42.8 | 4162 | 0.08 |
| 236 | 44.0 | 10.9 | 26.1 | 19.0 | — | 9.2 | 0.1 | 82.3 | <0.1 | 0.06 | 37.3 | 4104 | 0.09 |
| 237 | 44.0 | 12.9 | 26.1 | 17.0 | — | 8.9 | 0.1 | 72.3 | <0.1 | 0.04 | 30.8 | 4052 | 0.08 |
| 238 | 44.0 | 17.0 | 26.1 | 12.9 | — | 6.6 | 0.2 | 69.5 | 0.3 | 0.04 | 14.2 | 3833 | 0.08 |
| 239 | 44.0 | 19.0 | 26.1 | 10.9 | — | 6.4 | 0.2 | 55.4 | 0.2 | 0.12 | 13 | 3790 | 0.08 |
| 240 | 44.0 | 21.0 | 26.1 | 8.9 | — | 6.2 | 0.2 | 53.6 | 0.3 | 0.11 | 13.2 | 3743 | 0.07 |
| 241 | 40.0 | 8.0 | 42.0 | 10.0 | — | 11.5 | 0.1 | 49.6 | <0.1 | 0.05 | 2.54 | 3797 | 0.06 |
| 242 | 40.0 | 8.0 | 37.0 | 15.0 | — | 11.5 | 0.1 | 50.7 | <0.1 | 0.06 | 2.92 | 3788 | 0.08 |
| 243 | 28.1 | 6.3 | 52.3 | 13.3 | — | 3.4 | 0.4 | 52.3 | <0.1 | 0.09 | 2.46 | 3536 | 0.09 |
| 244 | 27.3 | 9.1 | 51.5 | 12.1 | — | 3.4 | 0.6 | 46.5 | <0.1 | 0.08 | 2.33 | 3460 | 0.06 |
| 245 | 26.4 | 11.8 | 50.0 | 11.8 | — | 3.4 | 0.5 | 41.2 | <0.1 | 0.08 | 2.18 | 3615 | 0.08 |
| 246 | 35.5 | 3.2 | 54.8 | 6.5 | — | 3.6 | 1 | 59.5 | <0.1 | 0.02 | 0.94 | 3795 | 0.07 |
| 247 | 34.4 | 6.3 | 53 | 6.3 | — | 3.6 | 1 | 59.6 | <0.1 | 0.05 | 0.53 | 3679 | 0.05 |
| 248 | 33.3 | 9.1 | 51.5 | 6.1 | — | 3.6 | 1 | 61.1 | <0.1 | 0.09 | 0.58 | 3629 | 0.06 |
| 249 | 35.5 | 3.2 | 54.8 | 6.5 | — | 7.1 | 0.3 | 64.7 | <0.1 | 0.08 | 1.11 | 3844 | 0.01 |
| 250 | 34.4 | 6.3 | 53 | 6.3 | — | 7.1 | 0.3 | 66.8 | <0.1 | −0.03 | 0.99 | 3770 | 0.02 |
| 251 | 33.3 | 9.1 | 51.5 | 6.1 | — | 7.1 | 0.3 | 66.9 | <0.1 | −0.02 | 0.87 | 3692 | 0.13 |
| 252 | 32.4 | 11.8 | 49.9 | 5.9 | — | 7.1 | 0.2 | 68.4 | <0.1 | −0.04 | 1.1 | 3660 | 0.05 |
| 253 | 31.4 | 14.3 | 48.6 | 5.7 | — | 7.1 | 0.2 | 69.1 | <0.1 | −0.07 | 1.12 | 3637 | 0.07 |
| 254 | 30.6 | 16.7 | 47.1 | 5.6 | — | 7.1 | 0.2 | 69.2 | <0.1 | 0.00 | 1.24 | 3621 | 0.06 |
| 255 | 29.7 | 18.9 | 46.0 | 5.4 | — | 7.1 | 0.1 | 69.4 | <0.1 | 0.01 | 1.36 | 3615 | 0.06 |
| 256 | 28.9 | 21.1 | 44.7 | 5.3 | — | 7.1 | 0.1 | 70.1 | <0.1 | 0.03 | 1.53 | 3607 | 0.07 |
| 257 | 28.2 | 23.1 | 43.6 | 5.1 | — | 7.1 | 0.1 | 71.1 | <0.1 | −0.03 | 1.65 | 3598 | 0.13 |
| 258 | 27.5 | 25 | 42.5 | 5.0 | — | 7.1 | 0.1 | 72.2 | <0.1 | −0.05 | 1.83 | 3594 | 0.33 |
| 259 | 34.4 | 6.3 | 49.9 | 9.4 | — | 5.6 | 0.3 | 60.1 | <0.1 | 0.51 | 0.85 | 3692 | 0.08 |
| 260 | 34.4 | 6.3 | 49.9 | 9.4 | — | 11.1 | <0.1 | 76.4 | <0.1 | 0.42 | 2.28 | 3858 | 0.06 |
| 261 | 34.4 | 6.3 | 49.9 | 9.4 | — | 16.7 | <0.1 | 77.3 | <0.1 | 0.37 | 7.89 | 4052 | 0.01 |
| 262 | 34.4 | 8.3 | 49.9 | 9.4 | — | 22.2 | <0.1 | 81.1 | <0.1 | 0.25 | 35.71 | 4301 | 0.03 |
| 263 | 34.4 | 6.3 | 46.8 | 12.5 | — | 5.8 | 0.3 | 61.2 | <0.1 | 0.63 | 1.15 | 3672 | 0.04 |
| 264 | 34.4 | 6.3 | 46.8 | 12.5 | — | 11.5 | <0.1 | 75.4 | <0.1 | 0.54 | 3.54 | 3875 | 0.05 |
| 265 | 34.4 | 6.3 | 46.8 | 12.5 | — | 17.3 | <0.1 | 78.3 | <0.1 | 0.49 | 12.81 | 4063 | 0.2 |
| 266 | 34.4 | 6.3 | 46.8 | 12.5 | — | 23.1 | <0.1 | 79.7 | <<0.1 | 0.38 | 78.99 | 4401 | 0.17 |
| 267 | 58.4 | 12.8 | 27.8 | — | 1.0 | 5.7 | 0.5 | 55.9 | <0.1 | 0.26 | 0.71 | 3508 | 0.21 |
| 268 | 58.4 | 12.8 | 27.8 | — | 1.0 | 10.9 | 0.1 | 60.1 | <0.1 | 0.36 | 1.64 | 3662 | 0.19 |
| 269 | 45.4 | 20.0 | 30.0 | — | 4.6 | 4.2 | 0.6 | 52.3 | <0.1 | 0.51 | 0.08 | 3113 | 0.23 |
| 270 | 45.4 | 20.0 | 30.0 | — | 4.6 | 8.4 | 0.4 | 55.3 | <0.1 | 0.64 | 0.12 | 3156 | 0.21 |
| 271 | 45.4 | 20.0 | 30.0 | — | 4.6 | 12.6 | 0.1 | 64.2 | <0.1 | 0.72 | 0.36 | 3389 | 0.16 |
| 272 | 45.4 | 20.0 | 30.0 | — | 4.6 | 16.2 | 0.1 | 66.5 | <0.1 | 0.98 | 0.78 | 3441 | 0.18 |

In each of Samples 198 to 272, each having a Mn content of about 0.1 mol % to about 90 mol %, a Ni content of about 0.1 mol % to about 45 mol %, and a Co content of about 0.1 mol % to about 90 mol % and each having a Ti content of about 0.5 parts by mole to about 30 parts by mole when the total molar quantity of Mn, Ni, and Co is defined as 100 parts by mole, the results demonstrate that $\Delta R_{25}/R_{25}$ is about 1.5% or less, which is satisfactory, the percentage of erosion by plating is about 3.5% or less, and transverse strength is about 35 N or more. Hence, the resulting laminated negative-characteristic thermistor has a low percentage of erosion by plating and excellent transverse strength. The percentage of the pore areas is as low as about 2.0% or less. The results demonstrate that even at a low sintering temperature, each sample is sufficiently sintered and has sufficient B constant and resistivity.

In each of Samples 235 to 266, the content of Fe is in the range of about 5 parts by mole to about 30 parts by mole when the total molar quantity of Mn, Ni, and Co is defined as 100 parts by mole, thus reducing variations in characteristic value (B constant 3CV).

In each of Samples 267 to 272, the content of Cu is in the range of about 1 part by mole to about 5 parts by mole when the total molar quantity of Mn, Ni, and Co is defined as 100 parts by mole. Hence, the dense ceramic body having a low percentage of the pore areas is obtained even when the ceramic body is formed by low-temperature sintering.

In Table 8, the sum of Mn, Ni, Co, and Fe is defined as 100 mol % or the sum of Mn, Ni, Co, and Cu is defined as 100 mol %. As described above, contents of Fe and Cu are represented in terms of part by mole when the sum of Mn, Ni, and Co is defined as 100 parts by mole.

Example 7

Samples 273 to 277 were produced by the same method as in Sample 5, except that in an Ag—Pd internal electrode, Ag was incorporated in an amount described in Table 9. Similarly, Samples 278 to 282 were produced by the same method as in Sample 117, except that Ag was included in an amount described in Table 9. The same characteristic evaluation was performed by the same method as in EXAMPLE 1. Table 9 shows the results.

TABLE 9

| Sample | Mn mol | Ni mol | Co mol | Ti part by mol | Ag content of Ag—Pd internal electrode (wt %) | Percentage of erosion by plating % | Transverse strength N | Percentage of pore area % | ΔR/R % | Resistivity kΩcm | 3CV of resistance % | B constant K | 3CV % |
|---|---|---|---|---|---|---|---|---|---|---|---|---|---|
| 273 | 78.5 | 21.5 | — | 5.0 | 100.0 | 0.9 | 62.8 | 0.9 | 0.54 | 5.8 | 24.5 | 4152 | 0.14 |
| 274 | 78.5 | 21.5 | — | 5.0 | 90.0 | 0.9 | 62.7 | 0.9 | 0.52 | 5.7 | 8.9 | 4149 | 0.15 |
| 275 | 78.5 | 21.5 | — | 5.0 | 80.0 | 0.9 | 62.7 | 0.9 | 0.52 | 5.7 | 3.4 | 4148 | 0.14 |
| 276 | 78.5 | 21.5 | — | 5.0 | 70.0 | 0.9 | 62.8 | 0.9 | 0.53 | 5.7 | 2.4 | 4148 | 0.13 |
| 277 | 78.5 | 21.5 | — | 5.0 | 60.0 | 0.9 | 62.8 | 0.9 | 0.51 | 5.7 | 2.6 | 4149 | 0.14 |
| 278 | 30.0 | — | 70.0 | 5.0 | 100.0 | 3.4 | 46.4 | 1.1 | 0.23 | 0.65 | 21.6 | 3963 | 0.11 |
| 279 | 30.0 | — | 70.0 | 5.0 | 90.0 | 3.4 | 46.3 | 1.1 | 0.21 | 0.65 | 8.6 | 3963 | 0.12 |
| 280 | 30.0 | — | 70.0 | 5.0 | 80.0 | 3.4 | 46.5 | 1.1 | 0.22 | 0.66 | 2.6 | 3962 | 0.10 |
| 281 | 30.0 | — | 70.0 | 5.0 | 70.0 | 3.4 | 46.2 | 1.1 | 0.21 | 0.65 | 2.2 | 3962 | 0.11 |
| 282 | 30.0 | — | 70.0 | 5.0 | 60.0 | 3.4 | 46.6 | 1.1 | 0.20 | 0.64 | 2.3 | 3963 | 0.12 |

As is apparent from Table 9, even when the Ag—Pd internal electrode materials each having a Ag content of about 60% to about 90%, the semiconductor ceramic material according to preferred embodiments of the present invention can be co-sintered with such a Ag—Pd internal electrode material, thereby producing an excellent negative-characteristic thermistor. The results demonstrate that the erosion of the ceramic body by a plating solution can be suppressed, and the high-reliability negative-characteristic thermistors having high transverse strength can be obtained.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A surface-mount negative-characteristic thermistor comprising:
    a ceramic body composed of a semiconductor ceramic material including Mn, Co, and Ti;
    external electrodes disposed on surfaces of the ceramic body; and
    plating films disposed on the external electrodes; wherein
    when the molar quantity of Mn in the semiconductor ceramic material is represented by a and when the molar quantity of Co in the semiconductor ceramic material is represented by c, the molar ratio of Mn to Co is in the range of $10/90 \leqq a/c \leqq 70/30$, and when the total molar quantity of Mn and Co in the semiconductor ceramic material is defined as 100 parts by mole, the content of Ti is in the range of about 1 part by mole to about 30 parts by mole; and
    when the total molar quantity of Mn and Co in the semiconductor ceramic material is defined as 100 parts by mole, the thermistor further comprises Fe in the range of about 7 parts by mole to about 31 parts by mole.

2. The surface-mount negative-characteristic thermistor according to claim 1, wherein when the molar quantity of Mn in the semiconductor ceramic material is represented by a and when the molar quantity of Co in the semiconductor ceramic material is represented by c, the molar ratio of Mn to Co is in the range of $30/70 \leqq a/c \leqq 40/60$, and when the total molar quantity of Mn and Co in the semiconductor ceramic material is defined as 100 parts by mole, the content of Ti is in the range of about 3 parts by mole to about 30 parts by mole.

3. The surface-mount negative-characteristic thermistor according to claim 1, wherein when the total molar quantity of Mn and Co in the semiconductor ceramic material is defined as 100 parts by mole, the thermistor further comprises Cu in the range of about 2 parts by mole to about 7 parts by mole.

4. The surface-mount negative-characteristic thermistor according to claim 2, wherein when the total molar quantity of Mn and Co in the semiconductor ceramic material is defined as 100 parts by mole, the thermistor further comprises Cu in the range of about 2 parts by mole to about 7 parts by mole.

5. The surface-mount negative-characteristic thermistor according to claim 4, wherein when the total molar quantity of Mn, Ni, and Co in the semiconductor ceramic material is defined as 100 parts by mole, the thermistor further comprises Cu in the range of about 1 part by mole to about 5 parts by mole.

6. The surface-mount negative-characteristic thermistor according to claim 1, wherein internal electrodes are embedded in the ceramic body and include Ag, and the internal electrodes are electrically connected to the external electrodes.

7. The surface-mount negative-characteristic thermistor according to claim 6, wherein the internal electrodes are each composed of Ag—Pd, and the content of Ag is in the range of about 60% to about 90%.

* * * * *